(12) United States Patent
Kennedy

(10) Patent No.: US 8,427,445 B2
(45) Date of Patent: Apr. 23, 2013

(54) VISUAL EXPANDER

(75) Inventor: Peter Kennedy, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 12/820,974

(22) Filed: Jun. 22, 2010

(65) Prior Publication Data

US 2010/0259500 A1    Oct. 14, 2010

Related U.S. Application Data

(63) Continuation of application No. 10/927,925, filed on Aug. 26, 2004, now Pat. No. 7,760,187.

(60) Provisional application No. 60/592,483, filed on Jul. 30, 2004.

(51) Int. Cl.
*G06F 3/041* (2006.01)

(52) U.S. Cl.
USPC .......................................... 345/173; 715/863

(58) Field of Classification Search .................. 345/173, 345/619; 715/863
See application file for complete search history.

(56) References Cited

U.S. PATENT DOCUMENTS

| | | | |
|---|---|---|---|
| 4,332,464 A | 6/1982 | Bartulis et al. | 355/14 |
| 4,680,429 A | 7/1987 | Murdock et al. | 178/19 |
| 4,698,625 A | 10/1987 | McCaskill et al. | 340/709 |
| 4,755,811 A | 7/1988 | Slavin et al. | 340/731 |
| 4,790,028 A | 12/1988 | Ramage | 382/47 |
| 5,016,002 A | 5/1991 | Levanto | 340/756 |
| 5,027,110 A | 6/1991 | Chang et al. | 340/731 |
| 5,053,758 A | 10/1991 | Cornett et al. | 340/712 |
| 5,079,723 A | 1/1992 | Herceg et al. | 395/156 |
| 5,119,079 A | 6/1992 | Hube et al. | 340/712 |
| 5,201,034 A | 4/1993 | Matsuura et al. | 395/155 |
| 5,260,697 A | 11/1993 | Barrett et al. | 345/173 |
| 5,266,931 A | 11/1993 | Tanaka | 345/173 |
| 5,266,949 A | 11/1993 | Rossi | 341/22 |
| 5,319,386 A | 6/1994 | Gunn et al. | 345/173 |
| 5,326,270 A | 7/1994 | Ostby et al. | 434/362 |
| 5,335,276 A | 8/1994 | Thompson et al. | 380/21 |
| 5,341,293 A | 8/1994 | Vertelney et al. | 364/419.17 |
| 5,341,466 A | 8/1994 | Perlin et al. | 395/139 |
| 5,347,295 A | 9/1994 | Agulnick et al. | |
| 5,367,453 A | 11/1994 | Capps et al. | |

(Continued)

FOREIGN PATENT DOCUMENTS

| EP | 0 283 995 A2 | 9/1988 |
|---|---|---|
| EP | 0 476 972 A2 | 3/1992 |

(Continued)

OTHER PUBLICATIONS

Lee et al., "A Multi-Touch Three Dimensional Touch-Sensitive Tablet," CHI 85 Proceedings, Apr. 1985, pp. 21-25.

(Continued)

*Primary Examiner* — Yong H Sim
(74) *Attorney, Agent, or Firm* — Morgan, Lewis & Bockius LLP

(57) ABSTRACT

A computer implemented method for a touchscreen display is disclosed. The method includes presenting graphical information on the touchscreen display. The method further includes detecting a touch over the touchscreen display. The method also includes expanding an area of the touch screen display proximate the location of the touch.

10 Claims, 19 Drawing Sheets

U.S. PATENT DOCUMENTS

| | | | |
|---|---|---|---|
| 5,408,060 A | 4/1995 | Muurinen | 200/314 |
| 5,422,656 A | 6/1995 | Allard et al. | 345/173 |
| 5,459,488 A | 10/1995 | Geiser | 345/173 |
| 5,463,725 A | 10/1995 | Henckel et al. | 395/155 |
| 5,465,401 A | 11/1995 | Thompson | 455/89 |
| 5,483,261 A | 1/1996 | Yasutake | 345/173 |
| 5,488,204 A | 1/1996 | Mead et al. | 178/18 |
| 5,511,148 A | 4/1996 | Wellner | 395/106 |
| 5,523,775 A | 6/1996 | Capps | |
| 5,543,588 A | 8/1996 | Bisset et al. | 178/18 |
| 5,543,897 A | 8/1996 | Altrieth, III | 355/209 |
| 5,553,225 A | 9/1996 | Perry | |
| 5,565,888 A | 10/1996 | Selker | 345/146 |
| 5,568,536 A | 10/1996 | Tiller et al. | 379/58 |
| 5,579,037 A | 11/1996 | Tahara et al. | 345/173 |
| 5,589,856 A | 12/1996 | Stein et al. | 345/173 |
| 5,615,384 A | 3/1997 | Allard et al. | 395/800 |
| 5,638,523 A | 6/1997 | Mullet et al. | 395/326 |
| 5,710,831 A | 1/1998 | Beernink et al. | 382/189 |
| 5,721,939 A | 2/1998 | Kaplan | |
| 5,736,974 A * | 4/1998 | Selker | 715/862 |
| 5,754,873 A | 5/1998 | Nolan | 395/789 |
| 5,757,358 A | 5/1998 | Osga | 345/146 |
| 5,760,773 A | 6/1998 | Berman et al. | 345/347 |
| 5,778,404 A | 7/1998 | Capps et al. | 707/531 |
| 5,815,142 A | 9/1998 | Allard et al. | 345/173 |
| 5,825,352 A | 10/1998 | Bisset et al. | 345/173 |
| 5,835,079 A | 11/1998 | Shieh | 345/173 |
| 5,877,751 A | 3/1999 | Kanemitsu et al. | 345/173 |
| 5,880,411 A | 3/1999 | Gillespie et al. | 178/18.01 |
| 5,910,800 A | 6/1999 | Shields et al. | 345/336 |
| 5,910,801 A | 6/1999 | Rosenburg et al. | |
| 5,926,769 A | 7/1999 | Valimaa et al. | 455/564 |
| 5,943,043 A | 8/1999 | Furuhata et al. | 345/173 |
| 5,956,021 A | 9/1999 | Kubota et al. | 345/179 |
| 5,967,996 A | 10/1999 | Kadota et al. | |
| 5,977,950 A | 11/1999 | Rhyne | 345/145 |
| 5,982,352 A | 11/1999 | Pryor | 345/156 |
| 6,020,881 A | 2/2000 | Naughton et al. | 345/327 |
| 6,037,939 A | 3/2000 | Kashiwagi et al. | 345/342 |
| 6,049,326 A | 4/2000 | Beyda et al. | 345/157 |
| 6,054,990 A | 4/2000 | Tran | 345/358 |
| 6,073,036 A * | 6/2000 | Heikkinen et al. | 455/550.1 |
| 6,121,960 A | 9/2000 | Carroll et al. | 345/173 |
| 6,157,935 A | 12/2000 | Tran et al. | 707/503 |
| 6,173,194 B1 | 1/2001 | Vanttila | 455/566 |
| 6,188,391 B1 | 2/2001 | Seely et al. | 345/173 |
| 6,262,735 B1 | 7/2001 | Eteläperä | 345/357 |
| 6,295,390 B1 | 9/2001 | Kobayashi et al. | 382/313 |
| 6,310,610 B1 | 10/2001 | Beaton et al. | 345/173 |
| 6,323,846 B1 | 11/2001 | Westerman et al. | 345/173 |
| 6,411,283 B1 | 6/2002 | Murphy | 345/173 |
| 6,525,749 B1 | 2/2003 | Moran et al. | 345/863 |
| 6,563,913 B1 | 5/2003 | Kaghazian | |
| 6,570,557 B1 | 5/2003 | Westerman et al. | 345/173 |
| 6,643,824 B1 | 11/2003 | Bates et al. | |
| 6,664,989 B1 | 12/2003 | Snyder et al. | 345/856 |
| 6,664,991 B1 | 12/2003 | Chew et al. | |
| 6,677,932 B1 | 1/2004 | Westerman | 345/173 |
| 6,690,387 B2 | 2/2004 | Zimmerman et al. | 345/684 |
| 6,822,635 B2 | 11/2004 | Shahoian et al. | |
| 6,850,220 B2 | 2/2005 | Sakaguchi | |
| 6,888,536 B2 | 5/2005 | Westerman et al. | |
| 6,938,222 B2 | 8/2005 | Hullender et al. | |
| 6,971,068 B2 | 11/2005 | Bates et al. | |
| 7,015,894 B2 | 3/2006 | Morohoshi | |
| 7,030,861 B1 | 4/2006 | Westerman et al. | |
| 7,047,503 B1 | 5/2006 | Parrish et al. | |
| 7,075,512 B1 | 7/2006 | Fabre et al. | 345/156 |
| 7,084,859 B1 | 8/2006 | Pryor | |
| 7,088,344 B2 | 8/2006 | Maezawa et al. | |
| 7,123,243 B2 | 10/2006 | Kawasaki et al. | |
| 7,184,064 B2 | 2/2007 | Zimmerman et al. | |
| 7,213,214 B2 * | 5/2007 | Baar et al | 715/801 |
| 7,218,226 B2 | 5/2007 | Wehrenberg | |
| 7,268,772 B2 | 9/2007 | Kawai et al. | |
| 7,305,630 B2 | 12/2007 | Hullender et al. | |
| 7,479,949 B2 | 1/2009 | Jobs et al. | |
| 7,536,656 B2 | 5/2009 | Hullender et al. | |
| 7,565,613 B2 | 7/2009 | Forney | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,683,889 B2 | 3/2010 | Rimas Ribikauskas et al. | |
| 7,705,830 B2 | 4/2010 | Westerman et al. | |
| 7,743,348 B2 | 6/2010 | Robbins et al. | |
| 7,760,187 B2 | 7/2010 | Kennedy | |
| 7,818,691 B2 | 10/2010 | Irvine | |
| 8,042,042 B2 | 10/2011 | Kim et al. | |
| 2001/0040587 A1 | 11/2001 | Scheck | 345/676 |
| 2002/0003469 A1 | 1/2002 | Gupta | |
| 2002/0011993 A1 | 1/2002 | Lui et al. | |
| 2002/0030665 A1 | 3/2002 | Ano | 345/168 |
| 2002/0059350 A1 | 5/2002 | Iwema et al. | 707/530 |
| 2002/0067346 A1 | 6/2002 | Mouton | 345/173 |
| 2002/0069220 A1 | 6/2002 | Tran | 707/503 |
| 2002/0080123 A1 | 6/2002 | Kennedy et al. | 345/173 |
| 2002/0080151 A1 | 6/2002 | Venolia | 345/660 |
| 2002/0097270 A1 | 7/2002 | Keely et al. | |
| 2002/0112180 A1 | 8/2002 | Land et al. | |
| 2002/0180763 A1 | 12/2002 | Kung | 345/173 |
| 2003/0014382 A1 | 1/2003 | Iwamoto et al. | |
| 2003/0063073 A1 | 4/2003 | Geaghan et al. | 345/173 |
| 2003/0137522 A1 | 7/2003 | Kaasila et al. | |
| 2004/0039934 A1 | 2/2004 | Land et al. | |
| 2004/0075695 A1 | 4/2004 | Chew et al. | |
| 2004/0130575 A1 | 7/2004 | Tai et al. | 345/773 |
| 2004/0135818 A1 | 7/2004 | Thomson et al. | 345/823 |
| 2004/0155888 A1 | 8/2004 | Padgitt et al. | 345/619 |
| 2004/0160419 A1 | 8/2004 | Padgitt | 345/173 |
| 2004/0174399 A1 | 9/2004 | Wu et al. | |
| 2004/0183817 A1 | 9/2004 | Kaasila | |
| 2004/0196267 A1 | 10/2004 | Kawai et al. | 345/173 |
| 2004/0203674 A1 | 10/2004 | Shi et al. | |
| 2004/0237053 A1 | 11/2004 | Impas et al. | |
| 2005/0005241 A1 | 1/2005 | Hunleth et al. | |
| 2005/0012723 A1 | 1/2005 | Pallakoff | |
| 2005/0024341 A1 | 2/2005 | Gillespie et al. | 345/173 |
| 2005/0052547 A1 | 3/2005 | Minakuti et al. | |
| 2005/0068342 A1 | 3/2005 | Ouchi et al. | |
| 2005/0076300 A1 | 4/2005 | Martinez | |
| 2005/0093826 A1 | 5/2005 | Huh | 345/168 |
| 2005/0111736 A1 | 5/2005 | Hullender et al. | |
| 2005/0135053 A1 | 6/2005 | Carroll | |
| 2005/0140660 A1 | 6/2005 | Valikangas | |
| 2005/0190147 A1 | 9/2005 | Kim | 345/156 |
| 2005/0192924 A1 | 9/2005 | Drucker et al. | |
| 2005/0229117 A1 | 10/2005 | Hullender et al. | |
| 2005/0243373 A1 | 11/2005 | Silverbrook et al. | |
| 2006/0001654 A1 | 1/2006 | Smits | 345/176 |
| 2006/0017692 A1 | 1/2006 | Wehrenberg et al. | |
| 2006/0022955 A1 | 2/2006 | Kennedy | |
| 2006/0026521 A1 | 2/2006 | Hotelling et al. | 715/702 |
| 2006/0026535 A1 | 2/2006 | Hotelling et al. | 715/863 |
| 2006/0026536 A1 | 2/2006 | Hotelling et al. | 715/863 |
| 2006/0033724 A1 | 2/2006 | Chaudhri et al. | |
| 2006/0041589 A1 | 2/2006 | Helfman et al. | |
| 2006/0053387 A1 | 3/2006 | Ording | |
| 2006/0066588 A1 | 3/2006 | Lyon et al. | |
| 2006/0085757 A1 | 4/2006 | Andre et al. | |
| 2006/0097991 A1 | 5/2006 | Hotelling et al. | 345/173 |
| 2006/0101354 A1 | 5/2006 | Hashimoto et al. | |
| 2006/0125803 A1 | 6/2006 | Westerman et al. | |
| 2006/0132460 A1 | 6/2006 | Kolmykov-Zotov et al. | 345/173 |
| 2006/0197753 A1 | 9/2006 | Hotelling | |
| 2006/0238519 A1 | 10/2006 | Westerman et al. | |
| 2006/0242607 A1 | 10/2006 | Hudson | |
| 2006/0244735 A1 | 11/2006 | Wilson | 345/173 |
| 2006/0265648 A1 | 11/2006 | Rainisto et al. | |
| 2006/0265653 A1 | 11/2006 | Paasonen et al. | |
| 2006/0274051 A1 | 12/2006 | Longe et al. | 345/173 |
| 2006/0277481 A1 | 12/2006 | Forstall et al. | |
| 2006/0284858 A1 | 12/2006 | Rekimoto | |
| 2006/0290678 A1 | 12/2006 | Lii | |
| 2007/0033544 A1 | 2/2007 | Fleisher et al. | |

| | | | |
|---|---|---|---|
| 2007/0115264 A1 | 5/2007 | Yu et al. | |
| 2007/0139374 A1 | 6/2007 | Harley .................... | 345/157 |
| 2007/0150842 A1 | 6/2007 | Chaudhri et al. | |
| 2007/0152978 A1 | 7/2007 | Kocienda et al. | |
| 2007/0152980 A1 | 7/2007 | Kocienda et al. | |
| 2007/0152984 A1 | 7/2007 | Ording et al. | |
| 2007/0157085 A1 | 7/2007 | Peters | |
| 2007/0238489 A1 | 10/2007 | Scott | |
| 2007/0247435 A1 | 10/2007 | Benko et al. | |
| 2007/0250793 A1 | 10/2007 | Miura et al. | |
| 2007/0257890 A1 | 11/2007 | Hotelling et al. | |
| 2007/0260981 A1 | 11/2007 | Kim et al. | |
| 2008/0002888 A1 | 1/2008 | Yuan | |
| 2008/0036743 A1 | 2/2008 | Westerman et al. | |
| 2008/0055269 A1 | 3/2008 | Lemay et al. | |
| 2008/0055273 A1 | 3/2008 | Forstall | |
| 2008/0077880 A1 | 3/2008 | Oygard | |
| 2008/0094368 A1 | 4/2008 | Ording et al. | |
| 2008/0098331 A1 | 4/2008 | Novick et al. | |
| 2008/0122796 A1 | 5/2008 | Jobs et al. | |
| 2008/0126387 A1 | 5/2008 | Blinnikka | |
| 2008/0165142 A1 | 7/2008 | Kocienda et al. | |
| 2008/0165143 A1 | 7/2008 | Tolmasky et al. | |
| 2008/0165160 A1 | 7/2008 | Kocienda et al. ........... | 345/175 |
| 2008/0168349 A1 | 7/2008 | Lamiraux et al. | |
| 2008/0168388 A1 | 7/2008 | Decker | |
| 2008/0174570 A1 | 7/2008 | Jobs et al. | |
| 2008/0184138 A1 | 7/2008 | Krzanowski et al. | |
| 2008/0201452 A1 | 8/2008 | Athas et al. | |
| 2008/0259040 A1 | 10/2008 | Ording et al. | |
| 2008/0270891 A1 | 10/2008 | Friedman et al. | |
| 2008/0294974 A1 | 11/2008 | Nurmi et al. | |
| 2008/0316183 A1 | 12/2008 | Westerman et al. | |
| 2008/0316212 A1 | 12/2008 | Kushler | |
| 2009/0093276 A1 | 4/2009 | Kim et al. | |
| 2009/0125848 A1 | 5/2009 | Keohane et al. | |
| 2009/0138810 A1 | 5/2009 | Howard et al. | |
| 2009/0153492 A1 | 6/2009 | Popp | |
| 2009/0167700 A1 | 7/2009 | Westerman et al. | |
| 2009/0225100 A1 | 9/2009 | Lee et al. ............... | 345/660 |
| 2009/0228792 A1 | 9/2009 | van Os et al. | |
| 2009/0228841 A1 | 9/2009 | Hildreth .................. | 715/863 |
| 2009/0228842 A1 | 9/2009 | Westerman et al. | |
| 2009/0235186 A1 | 9/2009 | Howard et al. | |
| 2010/0042933 A1 | 2/2010 | Ragusa | |
| 2010/0169766 A1 | 7/2010 | Duarte et al. | |
| 2010/0174979 A1 | 7/2010 | Mansfield et al. | |
| 2010/0174980 A1 | 7/2010 | Mansfield et al. | |
| 2010/0174985 A1 | 7/2010 | Levy et al. | |
| 2010/0202010 A1 | 8/2010 | Xiao | |
| 2010/0231529 A1 | 9/2010 | Tikka | |
| 2011/0258537 A1 | 10/2011 | Rives et al. | |

FOREIGN PATENT DOCUMENTS

| | | |
|---|---|---|
| EP | 0 575 146 A2 | 12/1993 |
| EP | 0 609 030 A1 | 8/1994 |
| EP | 0 651 543 A2 | 5/1995 |
| EP | 0 795 811 A1 | 9/1997 |
| EP | 1 674 976 A2 | 6/2006 |
| EP | 1 850 217 A2 | 10/2007 |
| FR | 2 898 197 A1 | 9/2007 |
| GB | 2 351 639 A | 1/2000 |
| GB | 2 433 402 A | 6/2007 |
| JP | 57-041731 | 3/1982 |
| JP | 59-057336 | 4/1984 |
| JP | 02153415 A | 6/1990 |
| JP | 03113578 A | 5/1991 |
| JP | 05 165459 | 7/1993 |
| JP | 6274586 A | 9/1994 |
| JP | 6332617 A | 12/1994 |
| JP | 07320051 | 12/1995 |
| JP | 07320079 | 12/1995 |
| JP | 8185265 A | 7/1996 |
| JP | 8227341 A | 9/1996 |
| JP | 2000 163031 | 6/2000 |
| JP | 2002 342033 A | 11/2002 |
| WO | WO 94/29788 A1 | 12/1994 |
| WO | WO 98/09270 A1 | 3/1998 |
| WO | WO 98/52118 A | 11/1998 |
| WO | WO 99/21084 A1 | 4/1999 |
| WO | WO 99/54807 A1 | 10/1999 |
| WO | WO 00/75766 A1 | 12/2000 |
| WO | WO 01/46790 A2 * | 6/2001 |
| WO | WO 03/023593 A1 | 3/2003 |
| WO | WO 2004/051392 A2 | 6/2004 |
| WO | WO 2004/070604 A2 | 8/2004 |
| WO | WO 2006/003591 A2 | 1/2006 |
| WO | WO 2006/020304 A2 | 2/2006 |
| WO | WO 2006/020305 A2 | 2/2006 |
| WO | WO 2006/126055 A2 | 11/2006 |
| WO | WO 2007/037806 A1 | 4/2007 |
| WO | WO 2008/030879 A2 | 3/2008 |
| WO | WO 2008/052100 A2 | 5/2008 |
| WO | WO 2009/085779 A1 | 7/2009 |
| WO | WO 2009/111249 A2 | 9/2009 |

OTHER PUBLICATIONS

Miller, D., "Personal/Java Application Environment," Jun. 8, 1999, 12 pages. http://java.sun.com/products/personaljava/touchable/.

Rekimoto, J. et al., "PreSense: Interaction Techniques for Finger Sensing Input Devices," UIST 2003, Vancouver, BC, Canada, ©2003 ACM, vol. 5, Issue 2, pp. 203-212.

International Search Report and Written Opinion dated Jul. 18, 2008, received in International Application No. PCT/US2007/082486, which corresponds to U.S. Appl. No. 11/923,453.

International Search Report and Written Opinion dated Jan. 10, 2008, received in International Application No. PCT/US2007/077645, which corresponds to U.S. Appl. No. 11/850,015.

Office Action dated Oct. 30, 2008, received in U.S. Appl. No. 11/553,436.

Office Action dated May 13, 2009, received in U.S. Appl. No. 11/553,436.

Office Action dated Oct. 30, 2009, received in U.S. Appl. No. 11/553,436.

Final Office Action dated Jun. 28, 2010, received in U.S. Appl. No. 11/553,436.

Notice of Allowance dated Sep. 29, 2010, received in U.S. Appl. No. 11/553,436.

Ahlberg, C. et al., "The Alphaslider: A Compact and Rapid Selector," ACM, Apr. 1994, proceedings of the SIGCHI conference on Human Factors in Computing Systems, pp. 365-371.

Ahlberg et al., "Visual Information Seeking: Tight Coupling of Dynamic Query Filters with Starfield Displays," Human Factors in Computing Systems, Boston MA, Apr. 24-28, 1994, 7 pages.

Ahlström et al., "Overcoming Touchscreen User Fatigue by Workplace Design," Proceeding CHI '92 Posters and short talks of the 1992 SIGCHI conference on Human factors in computing systems ACM, New York, 1992, 2 pages.

Baeza-Yates, R., "Visualization of Large Answers in Text Databases," AVI '96 Proceedings of the Working Conference on, Advanced Visual Interfaces, ACM, New York, 1996, 7 pages.

Barthel, B., "Information Access for Visually Impaired Persons: Do We Still Keep a 'Document' in 'Documentation'?" Professional Communication Conference, IPCC '95, Sep. 27-29, 1995, 5 pages.

Bederson et al., "Pad++: A Zooming Graphical Interface for Exploring Alternate interface Physics," UIST '94, 1994 ACM, 10 pages.

Bernabei et al., "Graphical I/O Devices for Medical Users," Engineering in Medicine and Biology Society, 1992 14th Annual International Conference of the IEEE, Oct. 29-Nov. 1, 1992, Paris, France, 3 pages.

Burger, D., "Improved Access to Computers for the Visually Handicapped: New Prospects and Principles," IEEE Transactions on Rehabilitation Engineering, vol. 2, No. 3. Sep. 1994, 8 pages.

Eslambolchilaar et al., "Making Sense of Fisheye Views," Second Dynamics and Interaction Workshop at University of Glasgow, Glasgow, Scotland, Aug. 2005, 6 pages.

Furnas, G., "Effective View Navigation," CHI '97 Proceedings of the SIGCHI conference on Human factors in computing systems, ACM, New York, 1997, 8 pages.

Furnas, G., "Generalized Fisheye Views," ACM SIGCHI Bulletin, Special Issue:CHI '86 Conference Proceedings, vol. 17, Issue 4, Apr. 1986, 8 pages.

Furnas, G., "The Fisheye Calendar System," Bellcore Technical Memorandum, Nov. 19, 1991, 9 pages.
Greenberg, S., "A Fisheye Text Editor for Relaxed-WYSIWIS Groupware," CHI '96 Companion, Vancouver, BC, Canada, Apr. 13-18, 1996, 2 pages.
Hinckley et al., "A survey of Design Issues in Spatial Input," Proceedings of the ACM Symposium on User Interfabe Software and Technology, Nov. 2-4, 1994, 10 pages.
Kamba et al., "Using small screen space more efficiently," CHI '96, Vancouver, BC, Canada, Apr. 13-18, 1996, 8 pages.
Keahey et al., "Non-Linear Image Magnification," Department of Computer Science, Indiana University, Apr. 24, 1996, 11 pages.
Keahey et al., "Nonlinear Magnification Fields," Department of Computer Science, Indiana University, Proceedings of the 1997 IEEE Symposium on Information Visualization, 12 pages.
Keahey et al., "Techniques for Non-Linear Magnification Transformations," Proceedings of the 1996 Symposium on Information Visualization, 8 pages.
Keahey et al., "Viewing Text With Non-Linear Magnification: An Experimental Study," Department of Computer Science, Indianan University, Apr. 24, 1996, 9 pages.
Kline et al., "Improving GUI Accessibility for People with Low Vision," Proceedings of the SIGCHI conference on Human factors in computing systems, May 7-11, 1995, 10 pages.
Kline et al., "UnWindows 1.0: X Windows Tools for Low Vision Users," Newsletter ACM SIGCHI Computers and the Physically Handicapped, Issue 49, Mar. 1994, 5 pages.
Lazzaro, J., "Adapting desktop computers to meet the needs of disabled workers is easier than you might think," Byte Magazine, Jun. 1993, #144, 5 pages.
Lemmons et al., "Hewlett-Packard makes some magic," Product Review, Byte Publications Inc., Oct. 1983, 15 pages.
Leung et al., "A Review and Taxonomy of Distortion-Oriented Presentation Techniques," ACM Transactions on Computer-Human Interaction, vol. 1, No. 2, Jun. 1994, 35 pages.
Lieberman, H., "A Multi-Scale, Multi-Layer, Translucent Virtual Space," First International Conference on Information Visualization (IV'97), London, England, Aug. 27-28, 8 pages.
Lieberman, H., "Powers of Ten Thousand: Navigating in Large Information Spaces," Proceedings of the ACM Symposium on User Interface Software and Technology, Nov. 2-4, 1994, 2 pages.
MacKenzie et al., "Alphanumeric entry on pen-based computers," International Journal of Human-Computer Studies (1994) 41, 18 pages.
NCIP staff, " Magnification Technology," National Center to Improve Practice in Special Education Through Technology, Media, and Materials, 1994, 7 pages, http://www2.edc.org/ncip/library/vi/magnifi.htm.
Noik, G., "Layout-independent Fisheye Views of Nested Graphs," in VL'93: IEEE Symposium on Visual Languages, IEEE 1993, 6 pages.
Plaisant et all., "Touchscreen Toggle Design," Proceedings of the Conference on Human Factors in Computing Systems, Addison Wesley, US, May 3, 1992, 2 pages.
Robertson et al., "The Document Lens," UIST '93 Proceedings of the 6th annual ACM symposium on User interface software and technology, ACM, NewYork, 1993, 8 pages.
Rosner et al., "In Touch: A Graphical User Interface Development Tool," Software Tools for Interface Design, IEEE Colloquium, London, UK, Nov. 8, 1990, 7 pages.
Sarkar et al., "Graphical Fisheye Views of Graphs," Chi'92, Proceedings of the SIGCHI conference on Human Factors in Computing Science, May 3-7, 1992, ACM N Y, 1992, 9 pages.
Sarkar et al., "Graphical Fisheye Views of Graphs," Mar. 17, 1992, DEC/Systems Research Center 1992, 31 pages.
Sarkar et al., "Graphical Fisheye Views," Communications of the ACM, Dec. 1994, vol. 37, No. 12, 12 pages.
Sarkar et al., "Stretching the Rubber Sheet: A Metaphor for Viewing Large Layouts on Small Screens," Proceedings of the ACM Symposium on User Interface Software and Technology, Nov. 3-5, 1993, 11 pages.
Sheelagh et al., "3-Dimensional Pliable Surfaces: For the Effective Presentation of Visual Information," 1995 User Interface Software & Technology, 11 pages.
Sheelagh et al., "Extending Distortion Viewing from 2D to 3D," IEEE Computer Graphics and Applications, vol. 17, Issue 4, Jul./Aug. 1997, 10 pages.
Sheelagh et al., "Making Distortions Comprehensible," Proceedings of Symposium on Visual Languages, 1997, 10 pages.
Simkovitz, D., "LP-DOS Magnifies the PC Screen," Proceedings of the Johns Hopkins National Search for Computing Applications to Assist Persons with Disabilities, Feb. 1-5, 1992, 2 pages.
Su, J., "A Review of Telesensory's Vista PCI Screen Magnification System," Journal of Visual Impairment & Blindness, Oct. 1998, 5 pages.
Su et al., "A Review of Supernova Screen Magnification Program for Windows," Journal of Visual Impairment & Blindness, Feb. 1999, 3 pages.
Su et al., "A Review of Zoom Text Xtra Screen Magnification Program for Windows 95," Journal of Visual Impairment & Blindness, Feb. 1998, 4 pages.
Uslan et al., "A Review of Henter-Joyce's MAGic for Windows NT," Journal of Visual Impairment and Blindness, Oct. 1999, 3 pages.
Uslan et al., "A Review of Two Screen Magnification Programs for Windows 95: Magnum 95 and LP-Windows," Journal of Visual Impairment & Blindness, Sep.-Oct. 1997, 5 pages.
Vogel et al., "Shift: A Technique for Operating Pen-Based Interfaces Using Touch," CHI 2007, Apr. 28-May 3, 2007, 10 pages.
Advances in Human-Computer Interaction, Chapters 1, 5, and 6, Ablex Publishing Corporation, 1992, 121 pages.
Bederson et al., "The Craft of Information Visualization," Elsevier Science (USA) 2003, 435 pages.
Benel et al., "Optimal Size and Spacing of Touch Screen Input Areas," INTERACT'87—2nd IFIP International Conference on Human-Computer Interaction, Sep. 1-4, 1987, Stuttgart, Germany, 5 pages.
Beringer et al., "Operator Behavioral Biases Using High-Resolution Touch Input Devices," Proceedings of the Human Factors Society 33rd Annual Meeting, 1989, 3 pages.
Beringer, D., Target Size, Location, Sampling Point and Instructional Set: More Effects on Touch Panel Operation, Proceedings of the Human Factors Society 34th Annual Meeting, 1990, 5 pages.
Bier, et al., "Toolglass and Magic Lenses: The See-Through Interface," Proceedings of SIGGRAPH '93, ACM 1993,18 pages.
Brown et al., "Browsing Graphs Using a Fisheye View," INTERCHI '93, Apr. 24-29, 1993, ACM 1993, 1 page.
Card et al., "Readings in Information Visualization Using Vision to Think," Morgan Kaufman Publishers, Inc., 1999, 711 pages.
Degani et al., "'Soft' Controls for Hard Displays: Still a Challenge," Proceedings of the Human Factors Society 36th Annual Meeting, 1992, 5 pages.
Furnas et al., "Space-Scale Diagrams: Understanding Multiscale Interfaces," CHI '95 Proceedings of the SIGCHI conference on Human factors in computing systems, ACM Press/Addison-Wesley Publishing Co. New York, NY, USA, 1995, 12 pages.
IBM, "Simon Says 'Here's How!'" Simon Users Manual, IBM Corp 1994, 63 pages.
Johnson, J., "A Comparison of User Interfaces for Panning on a Touch-Controlled Display," CHI '95 Proceedings, ACM 1995, 18 pages.
Lamping et al., "Laying out and Visualizing Large Trees Using a Hyperbolic Space," Proceedings of the 7th Annual ACM Symposium on User Interface Software and Technology, Nov. 2-4, 1994, ACM New York, NY, USA, 1994, 2 pages.
Leahy et al., "Effect of Touch Screen Target Location on User Accuracy," Proceeding of the Human Factors Society 34th Annual Meeting, 1990, 5 pages.
Mackinlay et al., "The Perspective Wall: Detail and Context Smoothly Integrated," Proceedings of CHI '91 ACM Conference on Human Factors in Computing Systems, ACM 1991, 7 pages.
Milner, N., "A Review of Human Performance and Preferences with Different Input Devices to Computer Systems," Proceedings of the 4th Conference of the British Computer Society on People and Computers, Cambridge University Press, 1988, 22 pages.
Phillipps, B., "Touchscreens are changing the face of computers," Electronic Products 1994, 7 pages.

Pickering, J., "Touch-sensitive screens: the technologies and their application," Int. J. Man-Machine Studies (1986), 21 pages.

Plaisant et al., "Touchscreen Interfaces for Alphanumeric Data Entry," Proceedings of the Human Factors Society 36th Annual Meeting, 1992, 5 pages.

Potter et al., "An Experimental Evaluation of Three Touch Screen Strategies within a Hypertext Database," International Journal of Human-Computer Interaction 1 (1) 41-52, 1989, 12 pages.

Potter et al., "Improving the Accuracy of Touch Screens: An Experimental Evaluation of Three Strategies," CHI '88 Proceedings of the SIGCHI conference on Human factors in computing systems, Acm New York, NY, USA, 1988, 6 pages.

Rao et al., "Exploring Large Tables with the Table Lens," CHI '95 Mosaic of Creativity, May 7-11, 1995, CHI' Companion 95, Denver, Colorado, USA, 2 pages.

Rao et al., "The Table Lens: Merging Graphical and Symbolic Representations in an Interactive Focus+Context Visualization for Tabular Information," Proceedings of the ACM SIGCHI Conference on Human Factors in Computing Systems, Boston, MA, Apr. 1994, 7 pages.

Ren et al., "Efficient strategies for selecting small targets on pen-based systems: an evaluation experiment for selection strategies and strategy classifications," Proceedings of the IFIP Tc2/TC13 WG2.7/WG13.4 Seventh Working Conference on Engineering for Human-Computer Interaction, Kluver, B.V. Deventer, The Netherlands, 1999, 19 pages.

Ren et al., "Improving Selection Performance on Pen-Based Systems: A Study of Pen-Based Interaction for Selection Tasks," ACM Transactions on Computer-Human Interaction, vol. 7, No. 3, Sep. 2000, 33 pages.

Ren et al., "The Best among Six Strategies for Selecting a Minute Target and the Determination of the Minute Maximum Size of the Targets on a Pen-Based Computer," INTERACT '97 Proceedings of the IFIP TC 13 International Conference on Human-Computer Interaction, Chapman & Hall, Ltd. London, UK, UK, 1997, 8 pages.

Riecken, R., "Adaptive Direct Manipulation," IEEE International Conference Proceedings on Systems, Man, and Cybernetics, 'Decision Aiding for Complex Systems, 1991, 6 pages.

Robertson et al., "Information Visualization Using 3D Interactive Animation," Communications of the ACM, Apr. 1993, vol. 36, No. 4, 15 pages.

Schaffer et al., "Navigating Hierarchically Clustered Networks through Fisheye and Full-Zoom Methods," ACM Transactions on Computer-Human Interaction, vol. 3, No. 2, Jun. 1996, 27 pages.

Scott et al., "Designing Touch Screen Numeric Keypads: Effects of Finger Size, Key Size, and Key Spacing," Proceedings of the Human Factors and Ergonomics Society 41st Annual Meeting, 1997, 5 pages.

Sears et al., "High precision touchscreens: design strategies and comparisons with a mouse," Int. J. Man-Machine Studies (1991) 34, 21 pages.

Sears et al., "Investigating touchscreen typing: the effect of keyboard size on typing speed," Behavior & Information Technology, 1993, vol. 12, No. 1, 6 pages.

Shneiderman, B., "Designing the User Interface Strategies for Effective Human-Computer Interaction," Second Edition, Addison-Wesley Publishing Company 1992, 599 pages.

Shneiderman, B., "Designing the User Interface Strategies for Effective Human-Computer Interaction," Third Edition, Addison-Wesley Publishing Company 1998, 669 pages.

Shneiderman, B., "Direct Manipulation for Comprehensible, Predictable and Controllable User Interfaces," IUI '97 Proceedings of the 2nd International Conference on Intelligent User Interfaces, ACM New York, New York, USA 1997, 7 pages.

Shneiderman, B., "The Eyes Have It: A Task by Data Type Taxonomy for Information Visualizations," Proceedings of the 1996 IEEE Symposium on Visual Languages (VL '96), 1996 IEEE, 8 pages.

Shneiderman, B., "Touch Screens Now Offer Compelling Uses," Interface IEEE Software, Mar. 1991, 2 pages.

Smith, R., "Relating Distortion to Performance in Distortion Oriented Displays," Proceedings Sixth Australian Conference on Computer-Human Interaction, 1996, Hamilton, New Zealand, 6 pages.

Sparks of Innovation in Human-Computer Interaction, B. Shneiderman, Ed., Ablex Publ., Norwood, N. J., (1993), various sections, 133 pages.

Stone et al., "The Movable Filter as a User Interface Tool," CHI '94 Proceedings of SIGCHI conference on Human factors in computing systems: celebrating interdependence, ACM New York, NY, USA, 1994, 7 pages.

Ware et al., "The DragMag Image Magnifier," CHI '95 Mosaic of Creativity, May 7-11, 1995, ACM 1995, 2 pages.

Rubine, D., "Combining Gestures and Direct Manipulation," Conference of Human Factors in Computing Systems, pp. 659-660, 1992.

Rubine, D., "The Automatic Recognition of Gestures," 1991 Dean Harris Rubine, in partial fulfillment of the requirements for the degree of Doctor of Philosophy in Computer Science, Carnegie Mellon University, 285 pages.

Westerman, W., "Hand Tracking Finger Identification and Chordic Manipulation on a Multi-touch Surface," Copyright® 1999 Wayne Westerman, 363 pages.

YouTube, iPhone Copy and Paste video, http://www.youtube.com/watch?v=UXgsQhiGeag.

International Search Report and Written Opinion dated May 2, 2011, received in International Appl. No. PCT/US2010/060113, which corresponds to U.S. Appl. No. 12/638,736.

Invitation to Pay Additional Fees dated Jun. 9, 2009, received in International Application No. PCT/US009/035177, which corresponds to U.S. Appl. No. 12/042,313.

International Search Report dated Sep. 10, 2009, received in International Application No. PCT/US2009/035177, which corresponds to U.S. Appl. No. 12/042,313.

European Search Report dated Aug. 20, 2009, received in European Application No. 09154312.4, which corresponds to U.S. Appl. No. 12/042,313.

Office Action dated Feb. 9, 2011, received in U.S Appl. No. 11/923,453.

Office Action dated Oct. 15, 2009, received in European Patent Application No. 07 854 411.1, which corresponds to U.S. Appl. No. 11/923,453.

Office Action dated May 5, 2008, received in U.S. Appl. No. 10/927,925.

Office Action dated Apr. 16, 2009, recieved in U.S. Appl. No. 10/927,925.

Final Office Action dated Nov. 17, 2009, recieved in U.S. Appl. No. 10/927,925.

Notice of Allowance dated Mar. 15, 2010, received in U.S. Appl. No. 10/927,925.

Notice of Allowance dated Jan. 27, 2011, received in U.S. Appl. No. 12/565,750.

Notice of Allowance dated Apr. 4, 2011, received in U.S. Appl. No. 12/565,750.

Office Action dated Dec. 7, 2010 received in U.S. Appl. No. 12/042,313.

Office Action dated Dec. 31, 2010, received in Chinese Patent Application No. 200910118597.9, which corresponds to U.S. Appl. No. 12/042,313.

Apple.com, "Quasi Clipboard," Apple Web Apps, Jan. 7, 2008, 1 page, http://www.apple.com/webapps/utilities/quasiclipboard.html.

Brighthand, "Thread: Cut, Copy & Paste," Brighthand.com, Jan. 13, 2005, http://forum.brighthand.com/showthread.php?t=82701, 2 pages.

Brighthand, "Thread: How do I cut & paste, & copy on a PDA," Brighthand.com, Sep. 19, 2004; http://forum.brighthand.com/showthread.php?s=2d32c96c9aaedaa454e3d05962503046&t=77588, 2 pages.

Chen. Y., "Detecting Web Page Structure for Adaptive Viewing on Small Form Factor Devices," Microsoft Research, l-yuchen@microsoft.com, May 20-24, 2003, 9 pages.

FreewarePalm, "CutPaste5 v3.1," FreewarePalm.com, Apr. 5, 2004, http://www.freewarepalm.com/utilities/cutpaste5.shtml, 2 pages.

Holman et el., "Paper-Windows: Interaction Techniques for Digital Paper." Papers: Physical Interaction, CHI 2005, Apr. 2-7, 2005, Portland, Oregon, USA, 9 pages.

Jordan, M., "Quick Look in Leopard," Mac Tips, Nov. 7, 2007, 6 pages, http://mactips.info/tips/2007/11/quick-look-in-leopard.

lonelysandwich, "iPhone Copy/Paste Proof of Concept Video," Jan. 28, 2008, 1 page, http://babygotmac.com/a/iphone-copypaste-proof-of-concept-video/.
Mac Forums, "How Would You Like Selection/Copy/Paste to Work?" Jul. 17, 2007, 13 pages, http://forums.macrumors.com/showthread.php?p=3932833#post3932833.
Mitchell, R. "GUI Gets a Makeover," Computerworld Software, 4 pages, Sep. 25, 2006, http://www.computerworld.com/action/article.do?command=printArticleBasic&articleId=263695.
Raskin, A., "Firefox Mobile Concept Video," Aza'S Thoughts, Jun. 11, 2008, http://www.azarask.in/blog/post/firefox-mobile-concept-vido/, 50 pages.
Shen et al., "Informing the Design of Direct-Touch Tabletops," IEEE Sep./Oct. 2006, pp. 36-46.
Starrett, C., "iPhone Gems: Top Photography and Image Manipulation Apps," iLounge, Oct. 8, 2008, 14 pages, http://www.ilounge.com/index.php/articles/comments/iphone-gems-top-photography-and-image-rnanipulation-apps.
Treo FAQ, "How can I copy and paste text on my Treo?" treocentral.com, downloaded Sep. 4, 2012, http://www.treocentral.com/content/FAQ/110.htm, 1 page.
vimeo, "iPhone Copy and Paste," lonelysandwich, Sep. 2007, http://www.vimeo.com/266383, 7 pages.
W3C, "Cascading Style Sheets," level 2 revision 1 Css 2,1 Specification, Jun. 13, 2005, 14 pages, http://www.w3.org/TR/2005/WD-CSS21-20050613.
Yatani et al., "Escape: A target Selection Technique Using Visually-cued Gestures," CHI 2008. Apr. 5-10, 2008, Florence, Italy, 10 pages.
YouTube, "Copy/Cut and Paste for iPhone," 3:19 minute video, uploaded to YouTube by madmaxwhatever on Aug. 20, 2008, http://www.youtube.com/watch?v=3-3ZmJL5BCg, 1 page.
YouTube, "Copy and Paste on a Palm Pre," 1:13 minute video uploaded to YouTube by MobileInfocenter on Jan. 9, 2009, http://www.youtube.com/watch?v=IuMEMEBiL_g, 2 pages.
YouTube, "eMInd Basic Gestures: Cutting, Copying and Pasting Text," 1:10 minute video uploaded to YouTube by quine42 on Nov. 22, 2008, http://www.youtube.com/watch?v=4QIOYiCcChc, 1 page.
YouTube, "iPhone Cut & Paste with(in) Citrix XenApp," 1:31 minute video uploaded to YouTube by chrisfictxs on Jan. 6, 2009, http://www.youtube.com/watch?v=NJDnQ4DAY3s, 1 page.
European Search Report and Written Opinion dated Mar. 6, 2012, received in European Patent Application No. 11186455.9, which corresponds to U.S. Appl. No. 11/923,453, 9 pages (Kocienda).
International Search Report and Written Opinion dated Nov. 12, 2009, received in International Application No. PCT/US2008/086542, which corresponds to U.S. Appl. No. 12/242,852, 16 pages (van Os).
International Preliminary Report on Patentability dated Sep. 16, 2010, received in International Application No. PCT/US2008/086542, which corresponds to U.S. Appl. No. 12/242,852, 11 pages (van Os).
International Search Report and Written Opinion dated Jun. 22, 2011, received in International Application No. PCT/US2010/026947, which corresponds to U.S. Appl. No. 12/565,750, 17 pages (Ording).
Final Office Action dated Oct. 31, 2011, received in U.S. Appl. No. 11/923,453, 23 pages (Kocienda).
Office Action dated Aug. 10, 2011, received in Chinese Patent Application No. 200780046864.5, which corresponds to U.S. Appl. No. 11/923,453, 10 pages (Kocienda).
Decision to Grant dated May 15, 2012, received in Chinese Patent Application No. 200780046864.5, which corresponds to U.S. Appl. No. 11/923,453, 4 pages (Kocienda).
Office Action dated Mar. 18, 2011, received in U.S. Appl. No. 12/242,852, 16 pages (van Os).
Final Office Action dated Sep. 21, 2011, received in U.S. Appl. No. 12/242,852, 6 pages (van Os).
Notice of Allowance dated Jan. 9, 2012, received in U.S. Appl. No. 12/242,852, 10 pages (van Os).
Notice of Allowance dated Apr. 27, 2012, received in U.S. Appl. No. 12/242,852, 25 pages (van Os).
Office Action dated Feb. 14, 2011, received in European Patent Application No. 08 873 123.7, which corresponds to U.S. Appl. No. 12/242,852, 4 pages (van Os).
Intention to Grant dated Sep. 13, 2011, received in European Patent Application No. 08 873 123.7, which corresponds to U.S. Appl. No. 12/242,852, 4 pages (van Os).
Decision to Grant dated Dec. 30, 2012, received in European Patent Application No. 08873123.7, which corresponds to U.S. Appl. No. 12/242,852, 1 page (van Os).
Office Action dated Sep. 26, 2011, received in U.S. Appl. No. 12/565,750, 11 pages (Ording).
Final Office Action dated Mar. 26, 2012, received in U.S. Appl. No. 12/565,750, 16 pages (Ording).
Notice of Allowance dated Jul. 3, 2012, received in U.S. Appl. No. 12/565,750, 34 pages (Ording).
Office Action dated Mar. 1, 2012, received in U.S. Appl. No. 12/566,751, 36 pages (Ording).
Final Office Action dated Jun. 22, 2012, received in U.S. Appl. No. 12/565,751, 18 pages (Ording).
Office Action dated Jan. 27, 2012, received in U.S Appl. No. 12/565,752, 33 pages (Ording).
Notice of Allowance dated Jun. 5, 2012 received in U.S. Appl. No. 12/565,752, 7 pages (Ording).
Office Action dated Mar. 13, 2012, received in U.S. Appl. No. 12/565,753, 31 pages (Ording).
Final Office Action dated Aug. 15, 2012, received in U.S. Appl. No. 12/565,753, 11 pages (Ording).
Office Action dated Jun. 12, 2012, received in U.S. Appl. No. 12/565,754, 41 pages (Ording).
Office Action dated Jul. 26, 2012, received in U.S. Appl. No. 12/565,755, 31 pages (Kocienda).
Office Action dated Feb. 2, 2014, received in U.S. Appl. No. 12/565,756, 31 pages (Kocienda).
Notice of Allowance dated May 31, 2012, received in U.S. Appl. No. 12/565,766, 5 pages (Kocienda).
Office Action dated Mar. 2, 2012, received in U.S. Appl. No. 12/565,757, 31 pages (Ording).
Final Office Action dated Aug. 15, 2012, received in U.S. Appl. No. 12/565,757, 12 pages (Ording).
Office Action dated Aug. 2, 2012, received in U.S. Appl. No. 12/665,769, 28 pages, (Ording).
Office Action dated Jan. 27, 2012, received in U.S Appl. No. 12/565,760, 39 pages (Ording).
Notice of Allowance dated Jun. 11, 2012, received in U.S. Appl. No. 12/565,760, 11 pages (Ording).
Notice of Allowance dated Oct. 2, 2012, received in U.S. Appl. No. 12/565,760, 13 pages (Ording).
Final Office Action dated Aug. 31, 2011 received in U.S. Appl. No. 12/342,313 (Westerman).
Office Action dated Sep. 27, 2012, received in U.S. Appl. No. 12/042,313, 26 pages (Westerman).
Office Action dated Aug. 24, 2011, received in Chinese Patent Application No. 200910118597.9, which corresponds to U.S. Appl. No. 12/042,313, 6 pages (Westerman).
Decision to Grant dated Jun. 5, 2012, received in Chinese Patent Application No. 200910118597.9, which corresponds to U.S. Appl. No. 12/042,313, 1 page (Westerman).

* cited by examiner

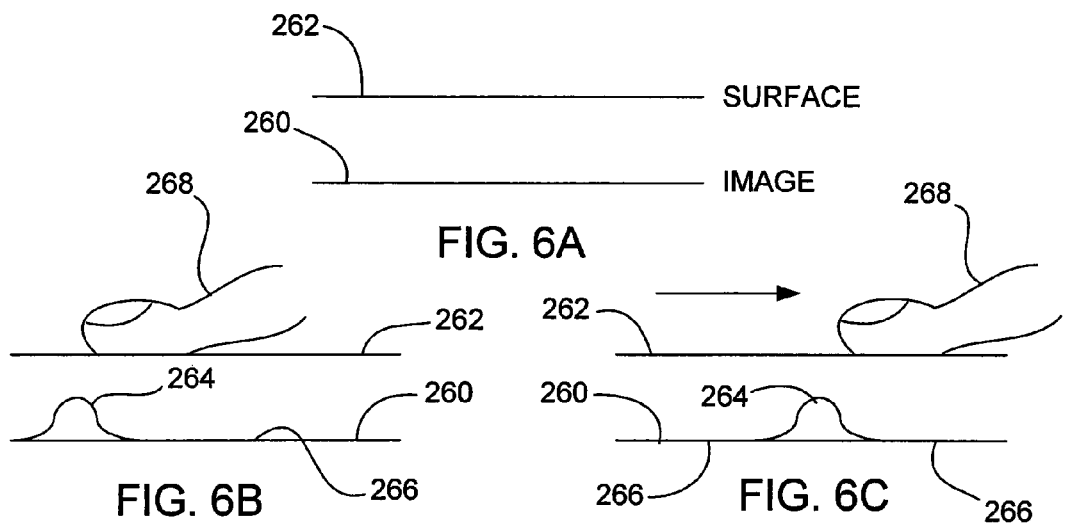
FIG. 6A
FIG. 6B
FIG. 6C
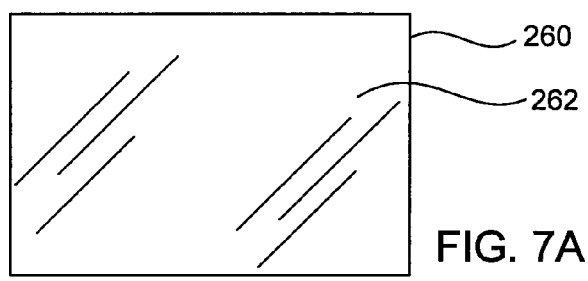
FIG. 7A
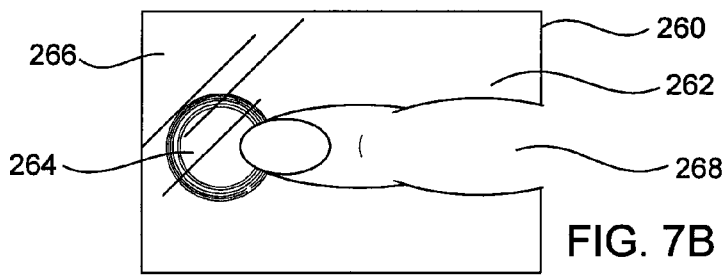
FIG. 7B
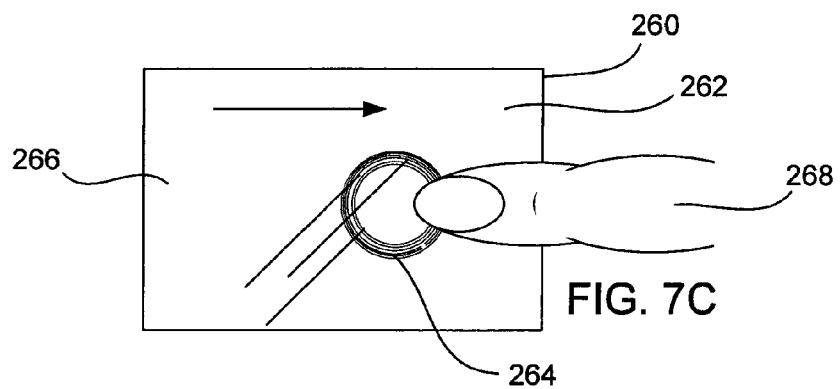
FIG. 7C

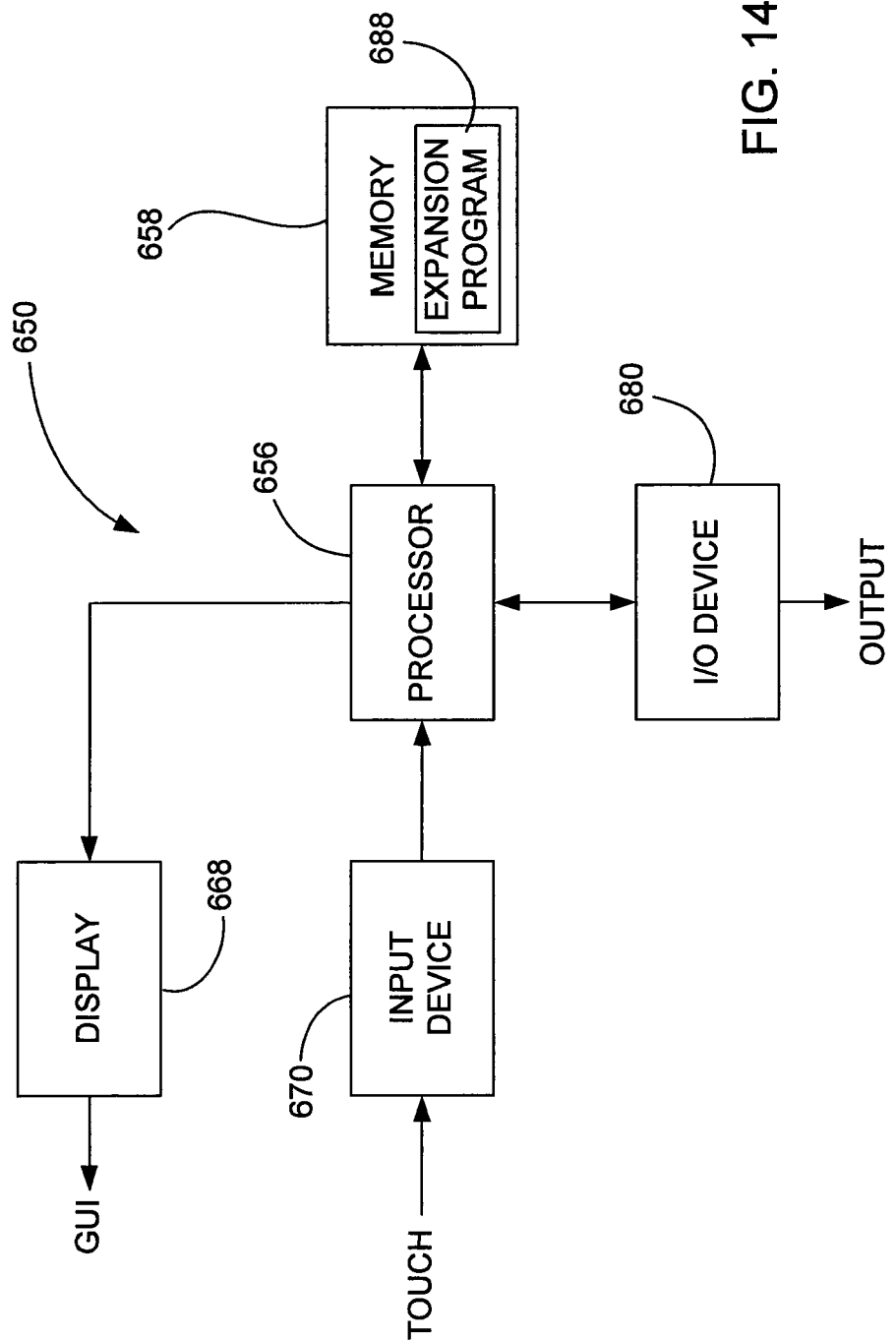

VISUAL EXPANDER

RELATED APPLICATION

This application is a continuation of U.S. application Ser. No. 10/927,925, filed Aug. 26, 2004 now U.S. Pat. No. 7,760,187, which claims priority to U.S. Provisional Application No. 60/592,483, filed Jul. 30, 2004, entitled "Touch Sensitive Techniques and Input Devices," which applications are incorporated herein by reference in their entirety.

BACKGROUND OF THE INVENTION

1. Field of the Invention

The present invention relates generally to methods and systems associated with touch screen displays. More particularly, the present invention relates to expanding graphical and sensitive portions of a touchscreen display.

2. Description of the Related Art

There exist today many styles of input devices for performing operations in a computer system. The operations generally correspond to moving a cursor and/or making selections on a display screen. By way of example, the input devices may include buttons or keys, mice, trackballs, touch pads, joy sticks, touch screens and the like. Each of these devices has advantages and disadvantages that are taken into account when designing or configuring a computer system.

Touch screens, in particular, are becoming increasingly popular because of their ease and versatility of operation as well as to their declining price. Touch screens allow a user to make selections and move a cursor by simply touching the display screen via a finger or stylus. For example, a user may make a selection by pointing directly to a graphical object displayed on the display screen. The graphical object may for example correspond to an on-screen button for performing specific actions in the computer system. In general, the touch screen recognizes the touch and position of the touch on the display screen and the computer system interprets the touch and thereafter performs an action based on the touch event. There are several types of touch screen technologies including resistive, capacitive, infrared and surface acoustic wave.

While touchscreens generally work well, they are difficult to use when features such as buttons, web page links, or UI controls presented on the touch screen display are too small for finger activation, i.e., the finger is too large relative to the button, link or UI controls. Even if these features could be enlarged to meet minimum human factors requirements, they would adversely reduce the amount of space available for displaying other information to the user. In fact, in most cases the features are made small due to the limited amount of screen space (especially in handheld devices). Furthermore, the features typically do not provide the user with any feedback indicating that a finger is located on the feature. This may make it difficult to determine what feature is being selected. As a result, the user may incorrectly select a feature. Moreover, once the size of the features are set, they typically cannot be changed. For example, in web browsing users have no control over the size of the link or button presented by a website.

In most small touchscreens such as those used in personal digital assistants, styli are used to help pin point areas for selection and to perform gestures such as those used to enter characters or symbols. While this generally provides a solution to activating small features, the styli has its own drawbacks. For example, the user still has to manipulate the stylus over the feature. This may be difficult for some users such as those who are visually impaired or those with limited coordination. In addition, the stylus can be lost and it can be aesthetically unpleasing. For example, the stylus is typically separate from the computing device in which it is used and therefore the stylus can be easily misplaced by the user. With regards to being aesthetically unpleasing, the computing device typically includes a receptacle, which receives the stylus and which produces unwanted breaks and cracks in the external surface of the computing device. Moreover, the stylus is less intuitive than using a finger.

Recently, several software products have come on the market that help visually impaired individuals see objects displayed on the screen. These software products are typically implemented in traditional computer systems such as those that include a desktop and a CRT monitor. The software products typically include magnifiers that magnify a portion of the screen. The magnifiers may for example be implemented with a virtual magnifying glass. The virtual magnifying glass magnifies the GUI in the area of the magnifying glass, i.e. similarly to moving a magnifying glass over a printed piece of paper. The magnifying glass allows the user to traverse through the GUI so that the user can read small text. In most cases, the virtual magnifying glass is controlled by moving a cursor such as for example via a remote mouse, or trackball. While virtual magnifying glasses work well, they are limited. For example, they typically do not allow features to be manipulated or selected inside the magnified area. Furthermore, they may not allow text editing therein.

Some operating systems such as Apple Computer's OS-X are designed to magnify a dock including the icons contained therein when the cursor is moved over the docks icons. While this works well, the feature has no control over the content presented on the remainder of the screen, i.e., the remaining portions of the screen do not magnify when the cursor is positioned thereover. Furthermore, this particular feature only works on the main system page. It does not work in programs or applications or even web pages.

SUMMARY OF THE INVENTION

The invention relates, in one embodiment, to a computer implemented method for a touchscreen display. The method includes presenting graphical information on the touchscreen display. The method further includes detecting a touch over the touchscreen display. The method also includes expanding an area of the touch screen display proximate the location of the touch.

The invention relates, in another embodiment, to a computer implemented method. The method includes presenting a graphical user interface (GUI). The method also includes sensing an object over the graphical user interface. The method further includes visually expanding an area of GUI near the sensed object. The method additionally includes if the expanded area includes a selectable feature, performing an action associated with the feature when the feature is selected. The method further includes if the sensed object is moving over the GUI, moving the expanded area in accordance with the moving object. Moreover, the method includes if the object is no longer sensed, maintaining the expansion of the expanded area in the last sensed location for a predetermined amount of time.

The invention relates, in another embodiment, to a computer implemented method. The method includes displaying graphical information. The method also includes detecting an object over the graphical information. The method further includes visually expanding portions of the graphical information in close proximity and underneath the detected object.

BRIEF DESCRIPTION OF THE DRAWINGS

The invention will be readily understood by the following detailed description in conjunction with the accompanying drawings, wherein like reference numerals designate like structural elements, and in which:

FIGS. 6A-6C are side views illustrating moving expansion, in accordance with one embodiment of the present invention.

FIGS. 7A-7C are top views illustrating moving expansion, in accordance with one embodiment of the present invention.

FIG. 14 is a block diagram of a computer system, in accordance with one embodiment of the present invention.

DETAILED DESCRIPTION OF THE INVENTION

Embodiments of the invention are discussed below with reference to FIGS. 1-15. However, those skilled in the art will readily appreciate that the detailed description given herein with respect to these figures is for explanatory purposes as the invention extends beyond these limited embodiments.

Figure 1:
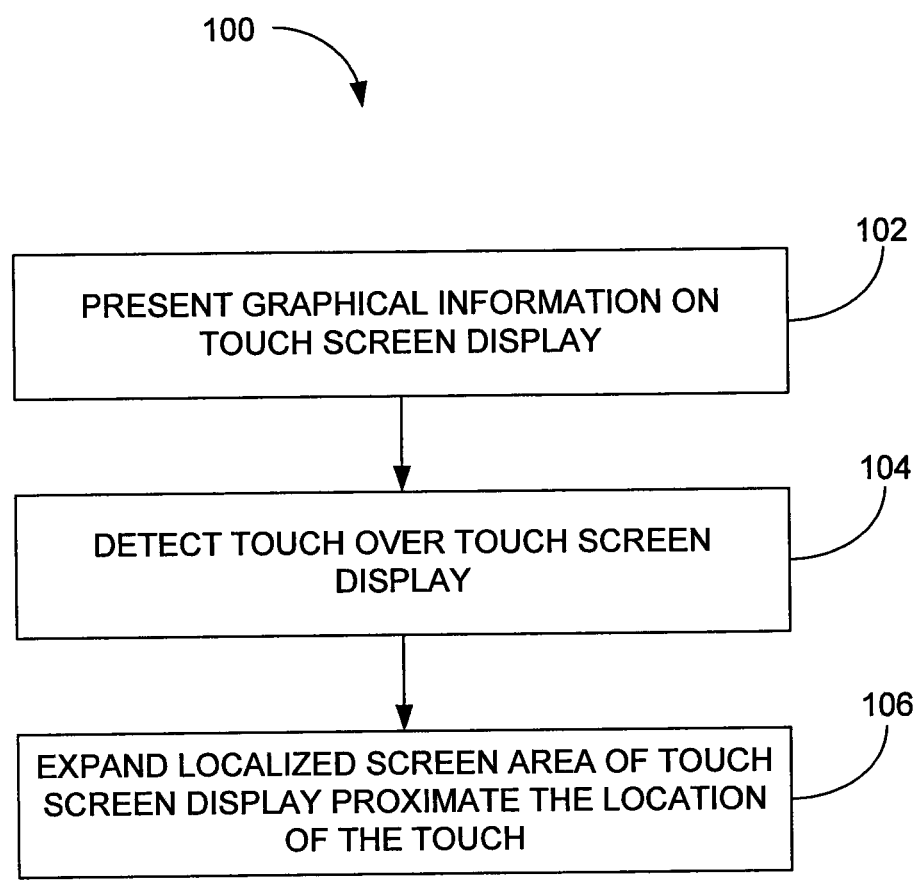
FIG. 1 is an expansion method, in accordance with one embodiment of the present invention.

FIG. 1 is an expansion method, in accordance with one embodiment of the present invention. The method may be implemented on computing devices having a touchscreen display. Touchscreen displays generally consist of a display and a substantially transparent touchscreen that is laid over the display. The display is configured to present graphical information, and the touchscreen is configured to receive touch inputs. The touchscreen may for example be used to perform tracking make selections, issue commands, and controlling interface elements with respect to the graphical information on the display. By way of example, the computing devices may include desktops, laptops, tablets, and handheld computers. The computer devices may also correspond to cell phones, PDAs, media players, consumer electronic devices, and/or the like.

The method generally begins at block 102 where graphical information is presented on the touchscreen display. This is typically accomplished with the display portion of the touchscreen display. In most cases the graphical information fills the entire display screen, although in some cases it may only fill a portion of the display screen. The graphical information may for example be a graphical user interface (GUI). As is generally well known, the GUI represents, programs, files and operational options with graphical images. The graphical images may include windows, fields, dialog boxes, menus, icons, buttons, cursors, scroll bars, etc. During operation, the user can select and activate various graphical images in order to initiate functions and tasks associated therewith. By way of example, a user may select a button that opens, closes, minimizes, or maximizes a window, an icon that launches a particular program or a link that opens a particular web page. In addition, the user may actuate user interface controls such as a scroll bar to perform scrolling in the GUI. The GUI can additionally or alternatively display non interactive text and graphics.

Following block 102, the method proceeds to block 104 where a touch is detected over the touchscreen display. This is generally accomplished with the touchscreen portion of the touchscreen display. In most cases, the touch screen recognizes one or more touches, as well as the position and magnitude of touches on its touch sensitive surface.

Following block 104, the method proceeds to block 106 where an area or portion of the touchscreen display is expanded proximate the location of the touch. Any portion of the touchscreen display can be expanded. The step of expanding may include visually expanding a portion of the presented graphical information in the region of the touch relative to the remaining portions of the presented graphical information outside the region of the touch. The step of expanding may also include expanding the touch sensitive portions associated with the expanded visual portion. The sensitive portion are points or regions of the touchscreen that are linked to particular points or regions of the graphical information as for example, the touch sensitive region above a graphical button. In most cases, the sensitive portions are scaled with the visually expanded portions. That is, the step of expanding includes scaling the input sensitivity with the expanded visual portions of the graphical information. The scaling may be proportional since the sensitive portions are typically a little larger than the visual portions (the visual portion and the sensitive portion aren't exactly a 1:1 relationship). By way of example, if the visual portion grows by a factor of 3 then the sensitive portion grows by a factor of 3.

During expansion, the visual and/or sensitive portions of the touchscreen display may be magnified and/or increased in size compared to the remaining visual and/or sensitive portions of the touchscreen display. By way of example, the visual portion may grow from its original size to an enlarged size (e.g., from 4 mm to 8 mm) and be magnified from its original state to a magnified state (e.g., from 1× to 2×). Although the expanded portions are enlarged and magnified, in most cases, the expanded portion maintains the same aspect ratio and shape that it has in the unexpanded state. As should be appreciated, expansion may be somewhat analogous to zooming.

The area that is expanded may be the area underneath the touch. Alternatively, the area that is expanded may be offset from the touch such as for example above, below or to the sides of the touch. This may allow the user to more clearly view the expanded area.

The size, magnification and shape of the expanded area may be widely varied. By way of example, and not by way of limitation, the expanded area may have an area of between about 100 mm² and about 400 mm², and a height and width between about 10 mm to about 20 mm. Furthermore, the expanded portions may be magnified between greater than 1 time to over a thousand times, more particularly between about 2× to about 100×, and even more particularly, the between about 2× and about 20×. Moreover, the expanded area may be formed from various shapes including but not limited to circles, ovals, squares, rectangles, triangles, and the like. Other shapes such as symbols, logos, characters may also be used.

In one embodiment, the expanded portion of the graphical information is raised relative to the non expanded portion of the graphical information. For example, the expanded portion may appear to protrude away from the non expanded portions. This is typically done graphically as both the expanded and non expanded portions are typically produced in the same plane. By way of example, shading principals may be used to make the expanded portion appear to protrude away from the non expanded portions.

In some cases, the expanded portion includes a substantially planar plateau region and a substantially sloped transition region. The planar plateau region provides a planar surface for displaying the targeted graphical information and the transition region provides a gradient of growth between the plateau region and the non expanded portion of the graphical information. The transition region, which is the edge of the plateau compacts or compresses the graphical information located between the plateau and the non expanded portion of the graphical information. For example, the graphical information contained in the transition region have compacted or compressed magnification levels (this may distort the graphical information contained therein) In alternative implementations, the plateau may be rounded rather than being planar or the expanded portion may be one large transition region without having a plateau. In either case, the expanded portion may look like a rounded pimple or bump.

The expanded portion may be a localized area, which can be any portion of the graphical information. The localized area may include any portion of the graphical information including but not limited to background (e.g., wall paper), windows, fields, text, dialog boxes, menus, icons, buttons, cursors, UI controls or any combination thereof.

The expanded portion may also be linked to a particular object of the graphical information. For example, a particular window, field, dialog box, menu, icon, button, tool bar, user interface element (e.g., scroll bar, scroll wheel, slider bar, dial), control box, footnote and the like. In some case, the entire object is expanded. For example, when the finger is placed over a window, the entire window is expanded. In other cases, only a portion of the object is expanded. For example, when the finger is placed over a tool bar, only the selectable items are expanded. As should be appreciated, these objects may need to be expanded so that they can be easily used by a human hand.

The time when expansion takes place can be widely varied. In one embodiment, expansion is activated immediately after the touch is detected. In another embodiment, expansion is activated after the touch is detected for a predetermined amount of time. In cases such as this, the user may have to hover their finger over the area desired to be expanded for the predetermined amount of time in order to initiate the expansion. By way of example, the dwell time may be between about 0.5 to about 5 seconds, and more particularly about 1 second. This embodiment may be employed to prevent inadvertent expansion. That is, the time delay may be used to avoid implementing expansion with casual contact not intended for expansion.

Once expansion is activated, the speed or rate at which the expanded area expands may be widely varied. The growth can happen quickly or slowly. In one embodiment, the expanded area grows from its normal state to the expanded state almost instantaneously. In another embodiment, the expanded area grows over some predetermined amount of time, i.e., the area expands gradually over time. The rate may be preset or it may be based on some external factor. For example, the rate of growth may be based on the touch pressure, i.e., the greater the touch pressure, the greater the rate of change. Alternatively, the rate of growth may be based on multiple taps, i.e., each tap causes incremental expansion.

The manner in which expansion is implemented may also be widely varied. In one embodiment, the amount of expansion (size, magnification, etc) is preset. The preset amount may be fixed or it may be adjustable. For example, a user may adjust the characteristics of expansion via a control menu. In another embodiment, the amount of expansion is based on some external factor. In one particular case, the amount of expansion is based on the amount of touch pressure. For example, the greater the pressure the greater the magnification or overall size of the localized area (or vice versa). In another case, the amount of expansion may be based on the location of the touch relative to the graphical information (e.g., region sensitivity). For example, a first located object of the graphical information may be magnified 2× and a second located object of the graphical information may be magnified 16×. In yet another embodiment, the expanded portion may be configured to follow the touch as the touch is moved across the touchscreen display. For example, the location of the expanded portion changes in accordance with the location of the touch, i.e., it mirrors the position of the touch.

Although not shown in FIG. 1, the method may include additional steps such as reverting back to a non expanded state when the touch is no longer detected. In one embodiment, the expansion is deactivated immediately after the touch is no longer detected thereby causing the expanded portion to revert back to its normal state. In another embodiment, expansion is deactivated after a predetermined amount of time, i.e., there is a lag time. The lag time may be preset (e.g., user settable) or it may be based on external factors such as the amount of information located in the expanded area and human factors such as how long the user would take to read or grasp this particular amount of information. The lag time may allow the user to establish if the expanded area is the desired target. If its not the desired target, the user can move their finger to a new target. If it is the desired target, the user may perform additionally steps within the expanded area. By way of example, and not by way of limitation the lag time may be between about 0.5 to about 5 seconds, and more particularly 1 second.

The speed or rate at which the expanded area reverts back to its normal state may be widely varied. The atrophy can happen quickly or slowly. In one embodiment, the expanded area atrophies from its expanded state to the normal state almost instantaneously. In another embodiment, the expanded area atrophies over some predetermined amount of time, i.e., the area atrophies gradually over time.

The method may also include receiving inputs within the expanded area. The inputs may for example be a selection input that is implemented with tapping or increased touch pressure. Alternatively, the input may be a gestural input or a data entry input. By way of example, in an expanded state, a virtual scroll wheel may be capable of being manipulated by a swirling finger gesture or text may be entered into an expanded document. In all of these cases, the expansion may be designed to expand a feature or group of features (such as buttons) so that they are adequately sized for finger manipulation.

Moreover, the method may include detecting a second touch over the touchscreen display and expanding a second area of the touchscreen display proximate to the location of the second touch. In one implementation, the second touch is detected at the same time as, the first touch such that the first and second expanded areas are expanded simultaneously (as for example using a multipoint touchscreen). In another implementation, the second touch is detected after the completion of the first touch. In cases such as this, if the second touch occurs during the lag time of the first expansion, then the first expansion may smoothly transition to the second expansion (e.g., as the first gradually shrinks, the second gradually expands). Alternatively, a second touch in the region of the expanded area may cause further expansion. For example, if the expanded portion includes a plurality of features, a second touch may be used to further expand one or more of the features. Thereafter, the feature may be selected for example by increasing the touch pressure or initiating a third touch such as a tap.

Alternatively, expansion may not be implemented if more than one touch is detected at the same time, i.e., simultaneously. This "double touch" could be considered a null input for the purposes of expansion.

The methods mentioned above may be implemented with software or hardware, or a combination of hardware and software. In one embodiment, the method is implemented by an operating system. As such, the method may be implemented during any program or application running in conjunction with the operating system. That is, expansion can occur in any program or application. By way of example, the operating system may correspond to Mac OS, OS/2, DOS, Unix, Linux, Palm OS, and the like. The operating system can also be a special purpose operating system, such as may be used for limited purpose appliance-type computing devices. Operating systems are generally well known and will not be described in greater detail.

Figure 2:
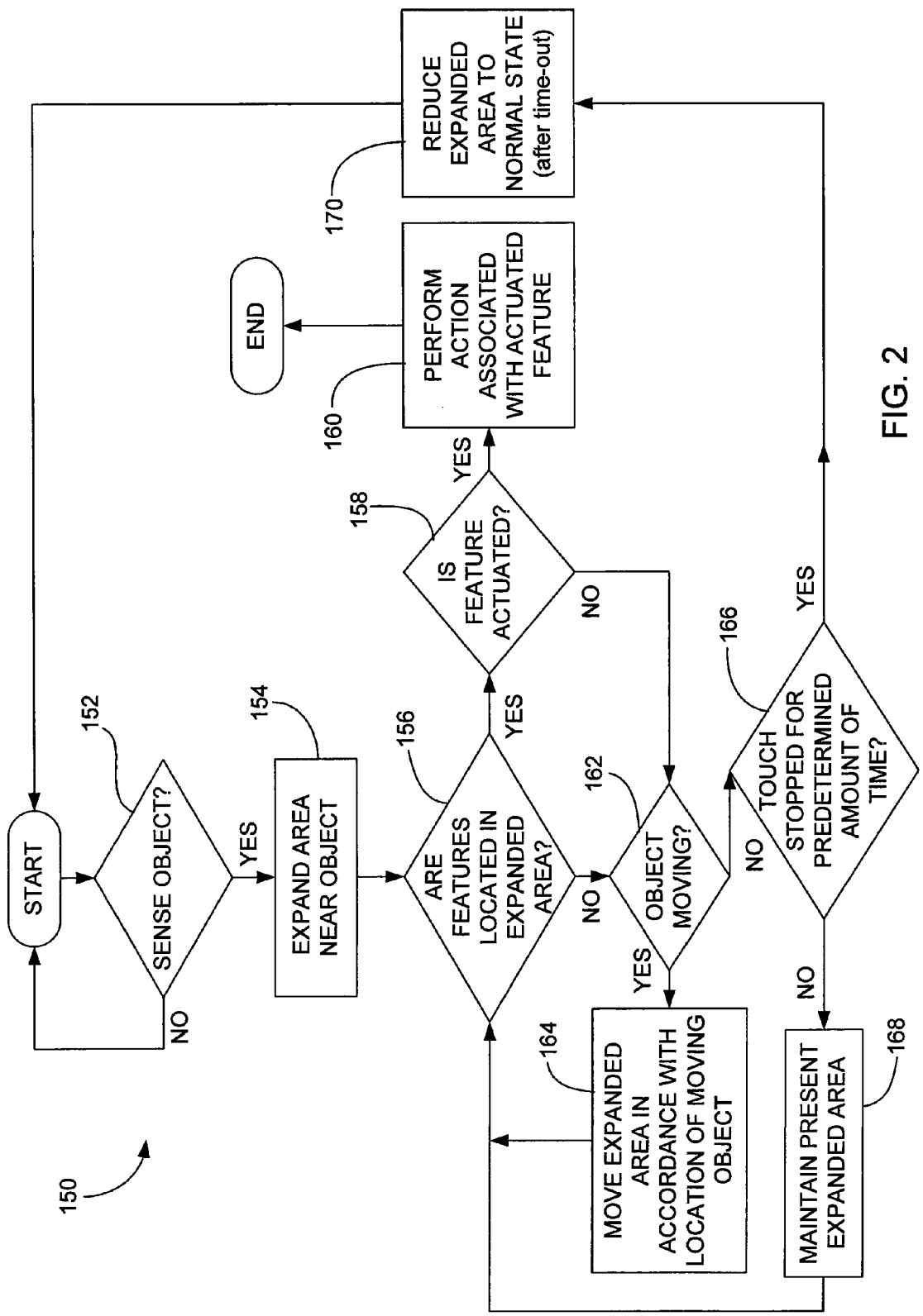
FIG. 2 is an expansion method, in accordance with one embodiment of the present invention.

FIG. 2 is a touchscreen display method 150, in accordance with one embodiment of the present invention. The method begins at block 152 where object sensing is performed via the touchscreen of the touchscreen display. The object may for example be a finger or palm of a user's hand. Alternatively, the object may be a stylus. In most cases, the sensing is performed when the object touches the touch sensitive surface of the touchscreen. In other cases, the object may be sensed when the object is placed over, but not in contact with the touchscreen.

If an object is sensed, the method proceeds to block 154 where the area near the sensed object is expanded. In particular, a portion of the GUI in the vicinity of the object is visually expanded relative to the remaining portions of the GUI. The touch sensitivity associated with the GUI is also expanded. The expanded area may be expanded immediately or it may appear to gradually grow until it reaches its final shape size, elevation, etc.

In most cases, the visually expanded portion is made to appear like it is protruding out of the image plane. The protruding effect is typically accomplished through graphics such as shading or other similar means. The protruding effect may be implemented in a localized area of the GUI or it may be implemented at a particular GUI image such as a control box, tool bar, user interface element, and/or the like.

In one embodiment, the expanded portion includes a plateau region and a transition region. During expansion, the target area contained within the plateau region increases in size and magnification. At the same time, the transition region compresses the GUI between the target area contained in the plateau region and the remaining unexpanded portions of the GUI. As a result, the plateau region appears to raise above the remaining portions of the GUI.

Following block 154, the method proceeds to block 156 where a determination is made as to whether or not features are located within the expanded area. The features may be buttons, web links, icons, user interface elements, data entry regions and/or the like.

If a feature is located within the expanded area, the method proceeds to block 158 where a determination is made as to whether or not the feature is actuated (e.g., selected, activated, etc.). The determination may include monitoring the sensed object and associating or linking a particular feature to the sensed object. The association or link may be made by ranking the relevance of the sensed object to the feature. The ranking may for example include producing a figure of merit, and whichever feature has the highest figure of merit, giving it sole access to the events occurring with the sensed object. By way of example, the ranking may include calculating the centroid of a touch and its proximity to the feature.

If the feature is a web link, button or icon, the feature may be actuated via a change in touch pressure, a time based hover, or a tap. With regards to touch pressure, a first touch pressure may initiate expansion and a second touch pressure may initiate a select command. The first and second touch pressure may be made within a single touch (continuous contact) or they may be separate events. This particular implementation may be based on the principle that when a finger lightly touches a planer surface, then a relatively small contact area may be detected. When the finger is pressed more forcefully against the surface, then a relatively large contact area may be detected. With regards to a time based hover, a select command may be generated when the finger is positioned over a particular selectable feature for a predetermined amount of time. With regards to tapping, a select command is generated when the user taps their finger on the feature while the feature is in the expanded state. The select command may be generated at touchdown or lift off. Furthermore, the tap may be a single tap or a double tap.

If the feature is a user interface element, the feature may be actuated via a gesture. See for example, U.S. patent application Ser. No. 10/903,964, titled "GESTURES FOR TOUCH SENSITIVE INPUT DEVICES," and filed on Jul. 30, 2004, which is herein incorporated by reference. If the feature is a data entry feature, the feature may be actuated by entering data as for example through the use of a cursor or keyboard (e.g., word processing).

In cases where the expanded area includes a plurality of features, an intermediate block may be included between blocks 156 and 158. The intermediate block includes providing feedback as to which feature is the most likely selectable feature based on some predefined criteria (the feedback indicates where a system thinks the user is targeting). The criteria may for example be based on the location of the sensed object relative the location of the various features. For example, the feature located closest to the object may indicate that it is the most likely candidate for selection. In essence, the feedback is a confirmation of correct targeting before selection. If the user does not get the right feedback, the user has the option of moving their finger to another location. The feedback may be visual or auditory. By way of example, visual feedback may include modifying the feature such as changing its color, position, size, shape, symbol, etc., and auditory indication may include providing sounds associated with the feature.

Once the feature is actuated, the method proceeds to block 160 where an action associated with the feature is performed. The action may for example include launching a particular program, opening a file or document, viewing a menu, making a selection, executing instructions, generating control signals, and the like. Following the action, the method may go back to start, or it may go back to block 154 depending on whether the user provides a continuous or segmented touch.

If the feature is not actuated or if there is no feature located within the expanded area, the method proceeds to block 162 where a determination is made as to whether or not the object (finger) is moving over the touchscreen. For example, if the object is standing still or whether the object is being dragged across the touch sensitive surface of the touchscreen.

If the object is moving, the method proceeds to block 164 where the expanded area is moved in accordance with the location of the moving object. That is, the expanded area follows the motion of the object. This is generally accomplished during continuous contact. In the case of a finger, the expanded area may follow the centroid of the finger's contact area. Following block 164, the method proceeds back to block 156.

If it is determined that the object is not moving, the method proceeds to block 166 where a determination is made as whether or not the object is still sensed. If so, the method proceeds to block 168 where the present expanded area is maintained. Thereafter, the method proceeds back to block 156. If the object is not sensed, the method proceeds to block 170 where the expanded area is reduced to its normal state. The reduction may mimic the expansion, but in a reverse direction. By way of example, in embodiments where the expanded portion includes a plateau region and a transition region, the target area contained within the plateau region may be decreased in size and magnification. At the same time, the transition region may decompress the GUI between the target area contained in the plateau region and the remaining unexpanded portions of the GUI. As a result, the plateau region appears to integrate back into the remaining portions of the GUI. Furthermore, the reduction may occur immediately after the touch is not sensed or after some predetermined amount of time.

Figure 3:
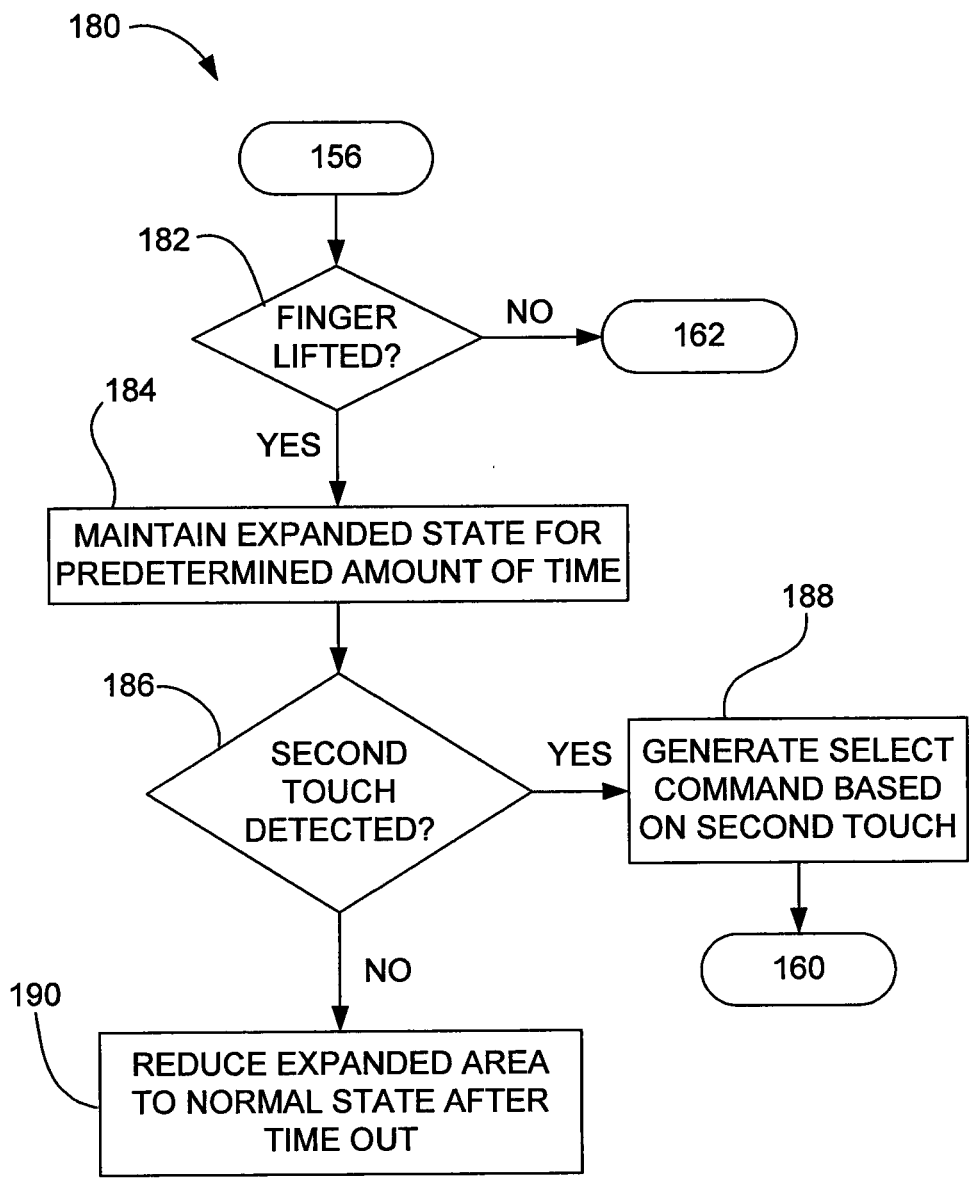
FIG. 3 is a touch based selection method, in accordance with one embodiment of the present invention.

FIG. 3 is a touch based selection method 180, in accordance with one embodiment of the present invention. The selection method 180 may for example be used in blocks 158 and 160 described in FIG. 2. The selection method generally occurs after blocks 152-156 where 1) the object is placed on a touchscreen surface and a first touch is detected by the touchscreen, and 2) the area around the touch is expanded and a determination is made as to whether or not features such as buttons or links are located in the expanded area.

The method generally begins at block 182 where a determination is made as to whether or not the finger is lifted off of the touchscreen. If not, the method proceeds for example to block 162. If so, the method proceeds to block 184 where the expanded state is maintained for a predetermined amount of time after the lift off. Thereafter, the method proceeds to block 186 where a determination is made as to whether or not a second touch is detected in the expanded area before the end of the time limit. If a second touch is detected, the method proceeds to block 188 where the second touch is associated with a feature in the expanded area and a select command associated with the feature is generated. The feature selected may for example be the feature closest to the second touch. In some cases, the select command is generated at finger lifted off (e.g., tap). In other cases, the select command is generated at placement of the second touch. Going back to block 186, if a second touch is not detected in the expanded area, the method proceeds to block 190 where the expanded area is reduced to its normal state after a time out. Block 190 may for example correspond to block 170 of FIG. 2.

Figure 4:
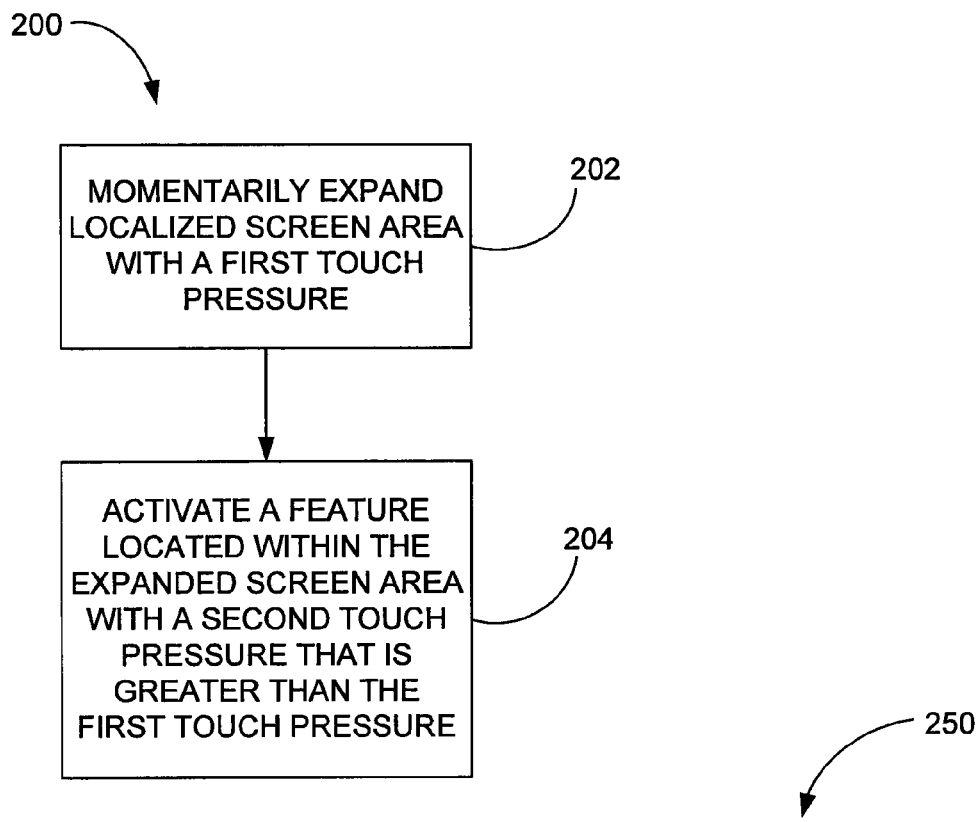
FIG. 4 is a touch based method, in accordance with another embodiment of the present invention.

FIG. 4 is a touch based method, in accordance with another embodiment of the present invention. The method includes blocks 202 and 204. In block 202, a localized screen area is momentarily expanded with a first touch pressure. The localized screen area includes a selectable feature such as a link or button. In block 204, the feature located within the expanded screen area is activated with a second touch pressure that is different than the first touch pressure. In some cases, the second touch is greater than the first touch, and in other cases, the second touch is less than the first touch. The first and second touches may be segmented contact or continuous contact. If segmented, the second touch generally needs to take place before the expanded area times out and goes back to its normal unexpanded state. If continuous contact, the second touch generally can take place at any time since the contact maintains the expanded state.

In one example of this embodiment, the user notices one or more features on the GUI and because they are small the user places their finger over the features for a predetermined amount of time in order to initiate the expansion of the features. Once expanded, the user views the features and moves their finger over the desired feature without removing their finger. Once over the desired feature and without removing their finger, the user exerts a second touch pressure that is greater than the first touch pressure used to initiate the expansion of the features. The second touch pressure activates the feature. For example, in the case of a web link, the web page associated with the web link is launched. In the case of a button, the action associated with the button is initiated.

Figure 5:
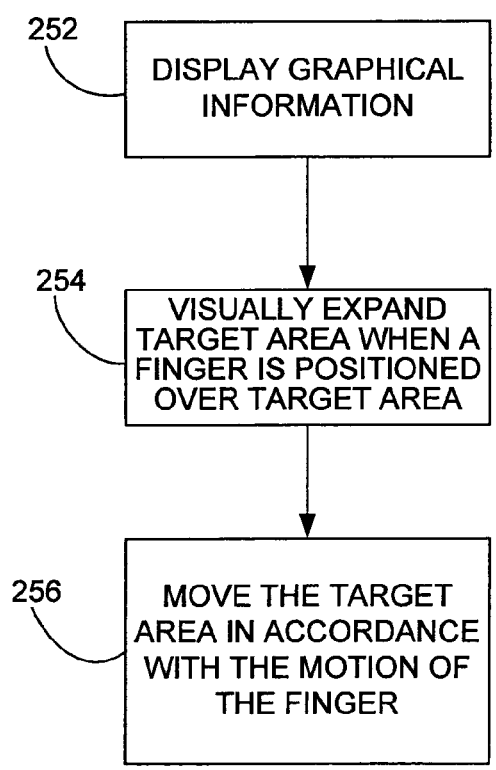
FIG. 5 is a touch based method, in accordance with one embodiment of the present invention.

FIG. 5 is a touch based method 250, in accordance with one embodiment of the present invention. The touch based method may for example be performed on a touchscreen display. The method includes blocks 252, 254 and 256. In block 252, graphical information is displayed. In block 254, a user targets an area of the graphical information and the target area is expanded when a user places their finger over the target area. In block 256, the expanded target area follows the motion of the finger as the finger is moved over the display screen. That is, the location of the target area changes with the location of the finger. In most cases, the following action occurs while the finger is sensed. Once the finger is not sensed, the expanded portion stops moving and goes back to its normal state after a time out. As should be appreciated, this method is more intuitive than using a remote input device and cursor, i.e., this is a direct action rather than a remote action.

FIGS. 6 and 7 are exemplary diagrams illustrating one embodiment of the method shown and described in FIG. 5. As shown in FIG. 6A and 7A, a GUI 260 is displayed underneath a transparent sensing surface 262. As shown in FIGS. 6B and 7B, a targeted portion 264 of the GUI 260 is expanded relative to other portions 266 of the GUI 260 when a finger 268 is positioned over the targeted portion 264. The targeted portion 264, which is a localized region of the GUI 260, can be any portion of the GUI 260. During expansion, the targeted portion 264 is increased in size, magnified and raised up relative to the remaining portion 266 of the GUI 260. Although shown raised and out of plane in FIG. 7B, it should be noted that the expanded targeted portion 264 is actually in plane. It is only shown this way to better illustrate the protruding effect caused by expansion. The illusion of raising the targeted portion 264 may be created in one embodiment by compressing the edges of the expanded targeted portion. As shown in FIGS. 6C and 7C, as the finger 268 is moved over the GUI 260, the expanded targeted portion 264 follows the motion of the finger 268. The expanded targeted portion 264 thereby informs the user to the location of the touch (similar to a cursor).

Figure 8:
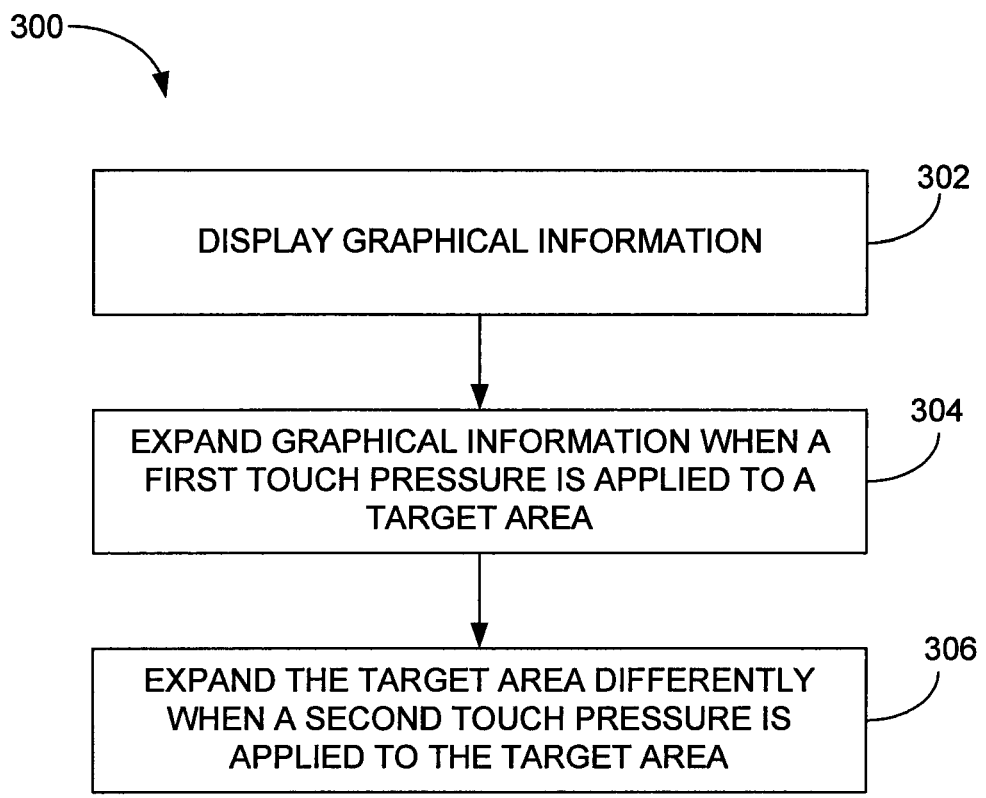
FIG. 8 is a touch based method, in accordance with another embodiment of the present invention.

FIG. 8 is a touch based method 300, in accordance with another embodiment of the present invention. The touch based method 300 may for example be performed on a touchscreen display. The method includes blocks 302, 304 and 306. In block 302, graphical information is displayed. In block 304, the graphical information is expanded when a first touch pressure is applied to a target area. In block 306, the expanded target area is expanded differently when a second touch pressure is applied to the target area. The second touch pressure generally occurs during a continuous touch, i.e., the first and second pressures occur in the same touch event (continuous contact with the touchscreen). By way of example, the size of expansion, the rate of expansion, the amount of magnification may all be based on the touch pressure. With regards to the size of expansion, the expanded portion may get larger with greater touch pressures and smaller with lower touch pressures. With regards to the rate of expansion, the expansion may grow faster with greater touch pressures or slower with lower touch pressures. With regards to magnification, the expanded area may magnify to larger values with greater touch pressures and lower values with lower touch pressures.

The method 300 may further include an additional block where the target area stays in the first expanded state when the touch is discontinued in the first expanded state or stays in the second expanded state when the touch is discontinued in the second expanded state.

Figure 9:
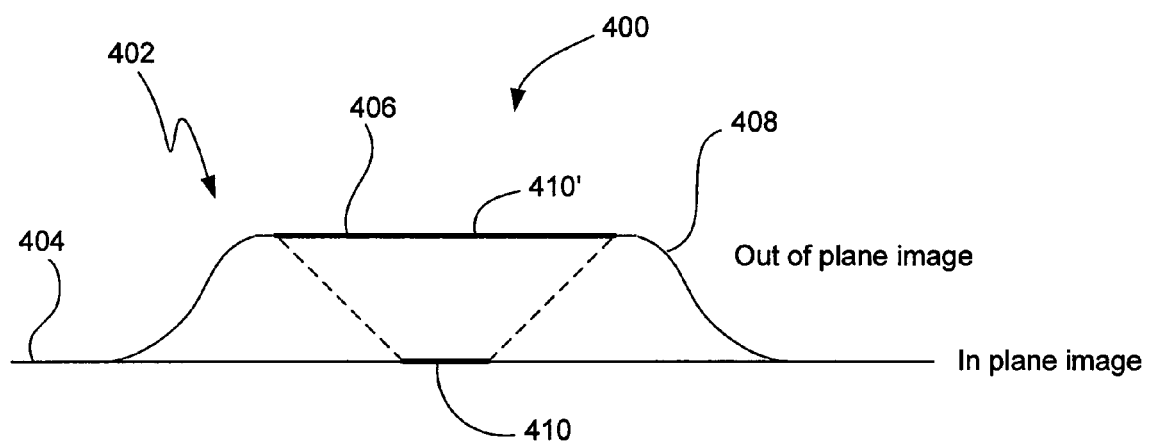
FIG. 9 is a side view showing a GUI in an unexpanded and expanded state, in accordance with one embodiment of the present invention.
Figure 10:
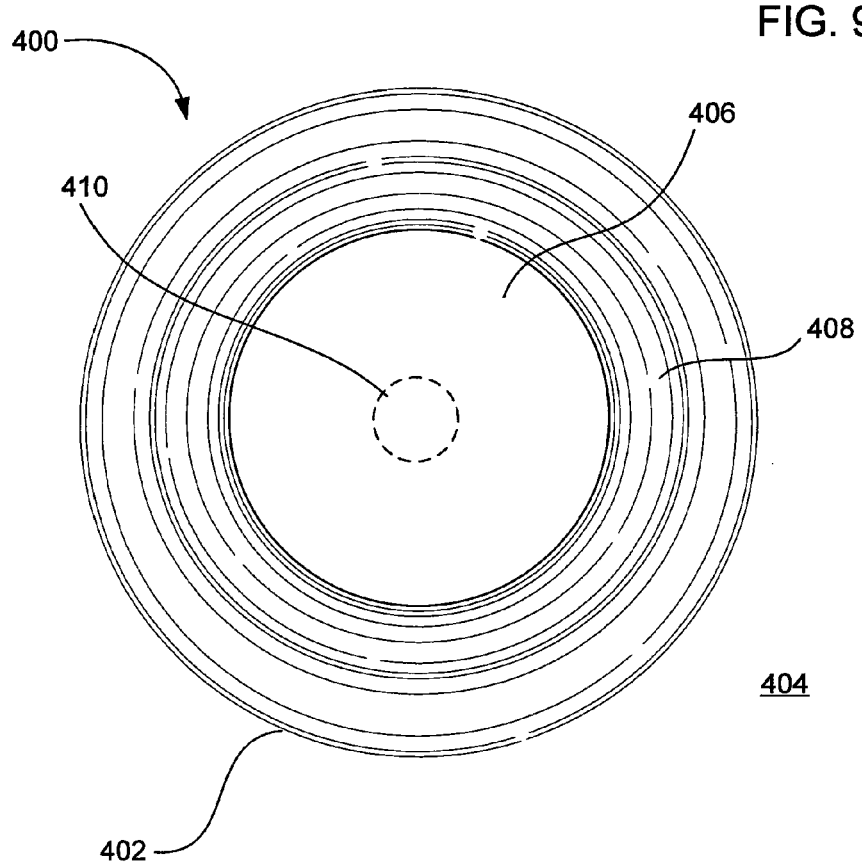
FIG. 10 is a top view showing a GUI in an unexpanded and expanded state, in accordance with one embodiment of the present invention.

FIGS. 9 and 10 are diagrams showing GUI 400 in an unexpanded and expanded state, in accordance with one embodiment of the present invention. FIG. 9 is a side view and FIG. 10 is a top view. As shown, the expanded portion 402 is enlarged, magnified and raised (e.g., pushed up) relative to the remaining portions 404 of the graphical information. Although the expanded portion appears to be out of plane relative to the remaining portions, it should be noted that the expanded portion is actually in plane with the remaining portions. Visual techniques are used to make it appear as if it is raised even though it is displayed in the same plane.

In the illustrated embodiment, the expanded portion includes a plateau region 406 and a transition region 408. The plateau region 406 is configured to display the target area 410 in a larger and magnified state. The transition region 408, on the other hand, is configured to compress the areas between the plateau region 406 and the remaining portions 404. The transition region 408 produces a slope or roll off at the edge of the plateau region 406. In fact, the transition region 408 may be a gradient of magnification between the remaining portions 404 and the plateau region 406. By way of example, when the plateau region 406 is magnified 3 times that of the target area 410, the magnification of the transition region 408 may slope from a magnification of 1 proximate the remaining portions 404 to a magnification of 3 proximate the plateau region 406. The size and slope of the transition region 408 may be widely varied. The size and slope may depend on the amount of virtual distortion that is desired or allowed. As should be appreciated, the greater the slope the greater the virtual distortion.

Figure 11:
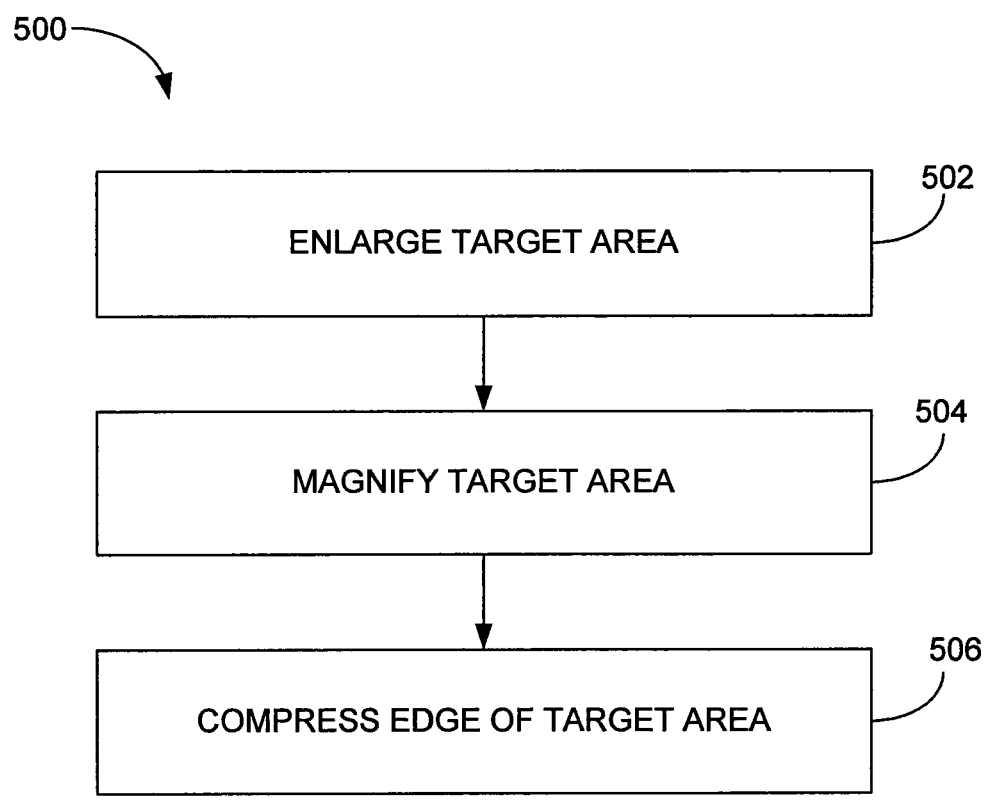
FIG. 11 is an expansion method, in accordance with one embodiment of the present invention.

FIG. 11 is an expansion method 500, in accordance with one embodiment of the present invention. The method 500 may for example correspond to any of the expansion steps mentioned herein. The method 500 includes block 502, 504 and 506. In block 502, the target area is enlarged. For example, the target area may be enlarged from a 3 mm×6 mm area to an area of about 6 mm×12 mm. In block 504, the target area is magnified. For example, the target area may be magnified 3× its normal state. In block 506, the outer edges of the target area are compressed to provide a smooth transition between the target area and the areas that are not targeted. The compressed area may include varying the magnification level between the enlarged target area and the non target areas that immediately surround the targeted area. The compressed area may be compressed in a topographical manner with each level representing a different magnification.

Figure 12A:
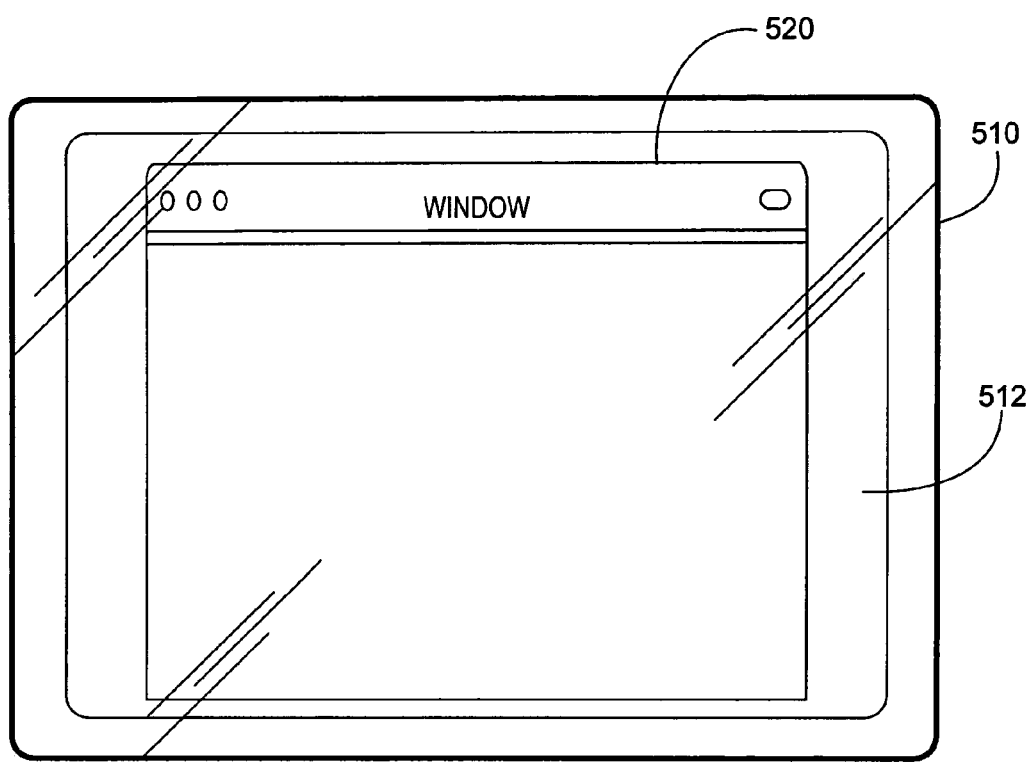
FIGS. 12A-12N illustrate an exemplary expansion sequence, in accordance with one embodiment of the present invention.
Figure 12B:
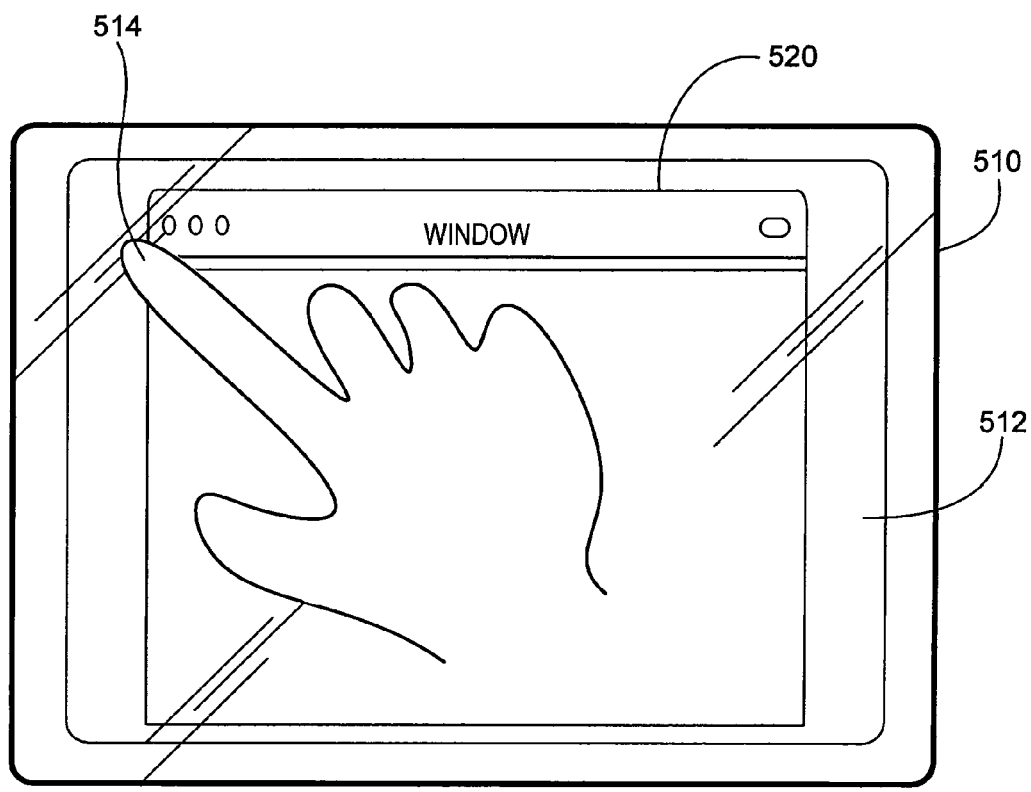
Figure 12C:
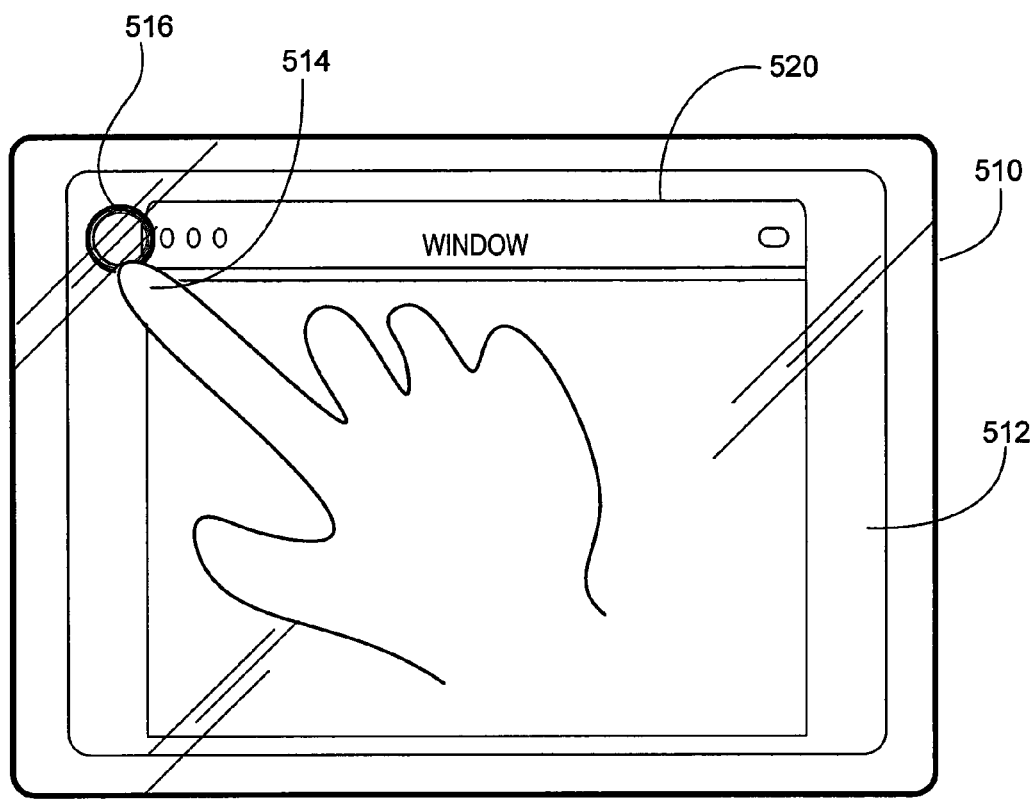
Figure 12D:
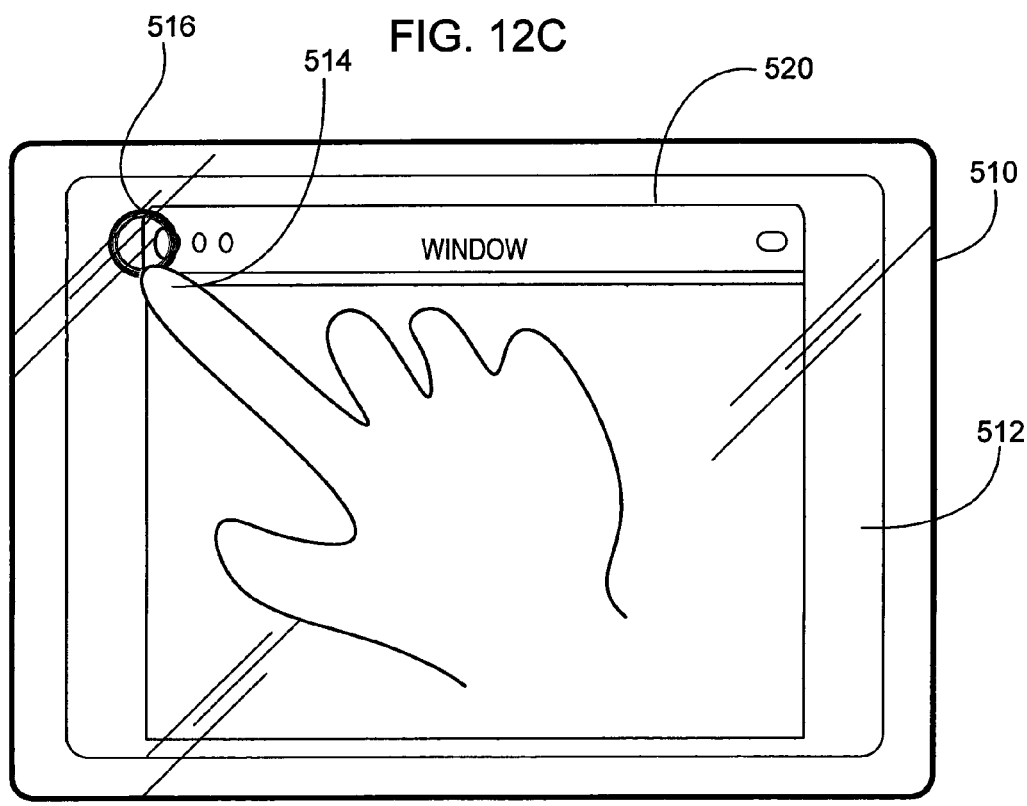
Figure 12E:
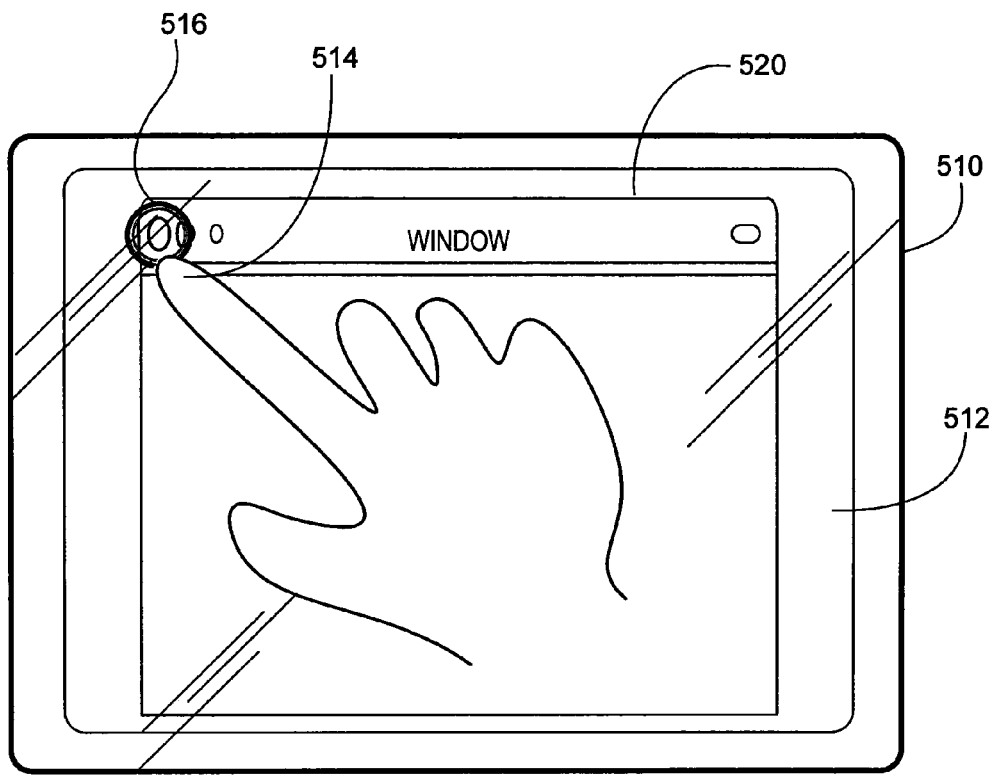
Figure 12F:
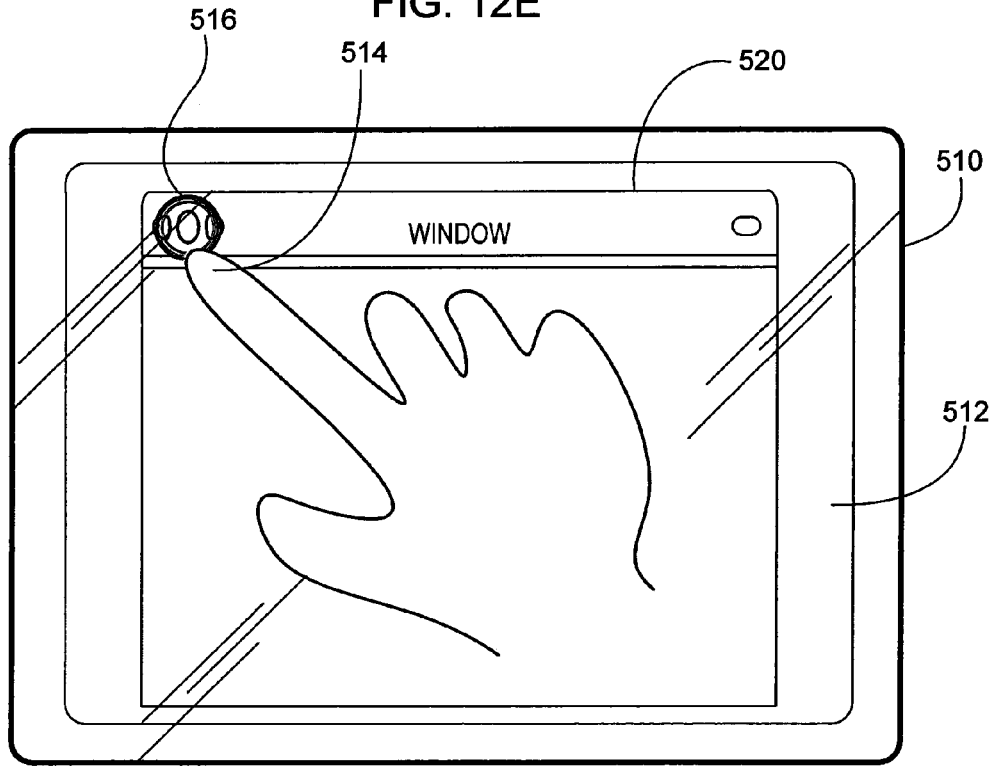
Figure 12G:
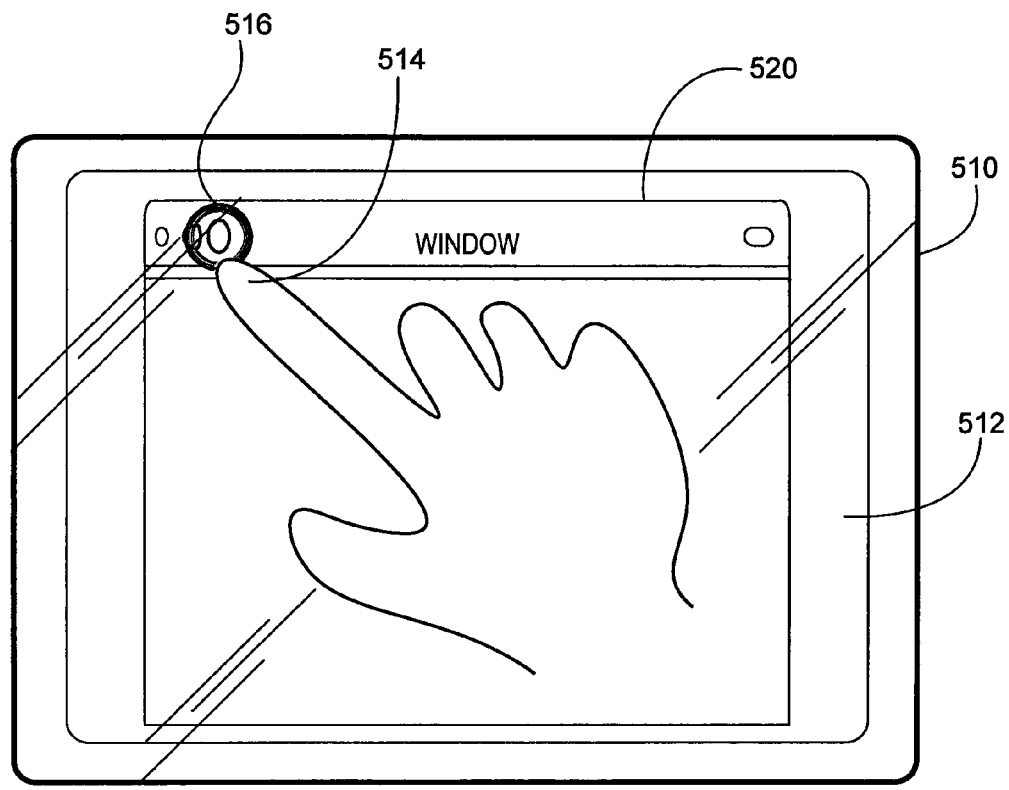
Figure 12H:
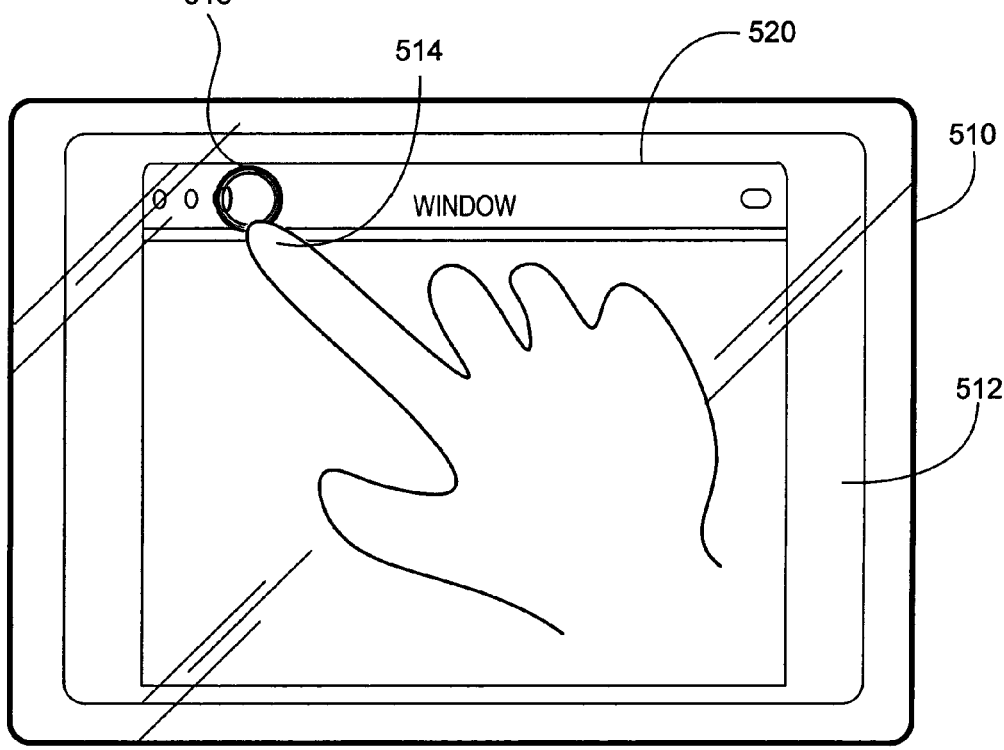
Figure 12I:
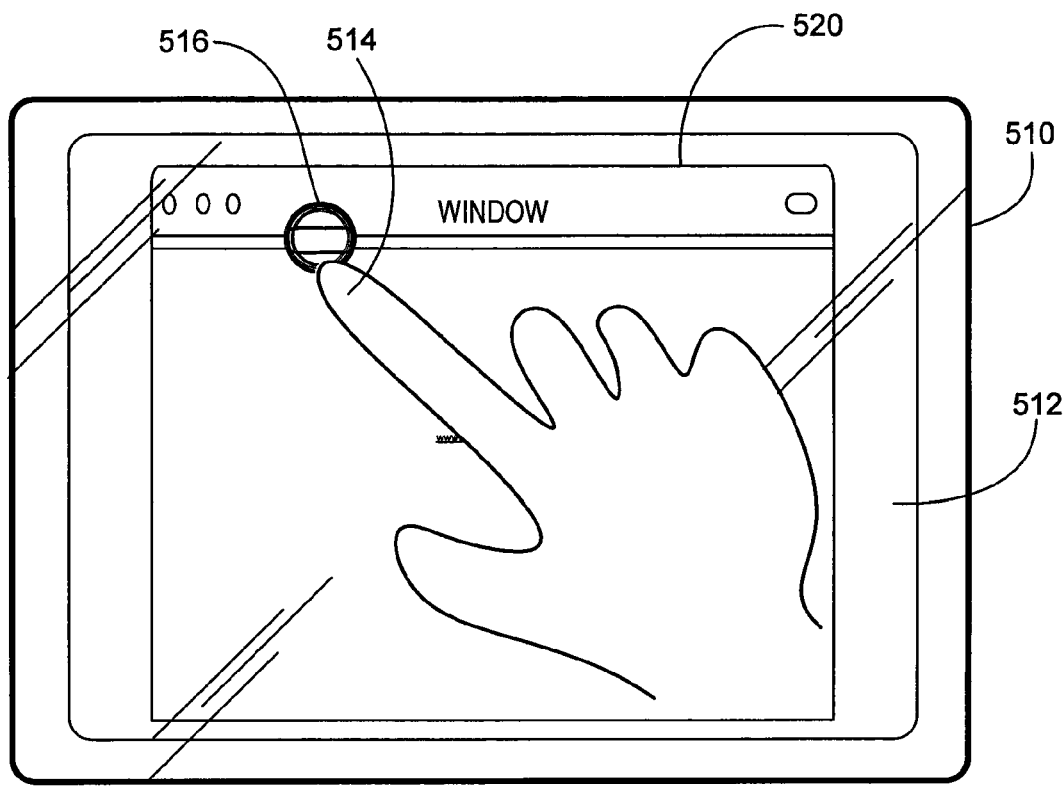
Figure 12J:
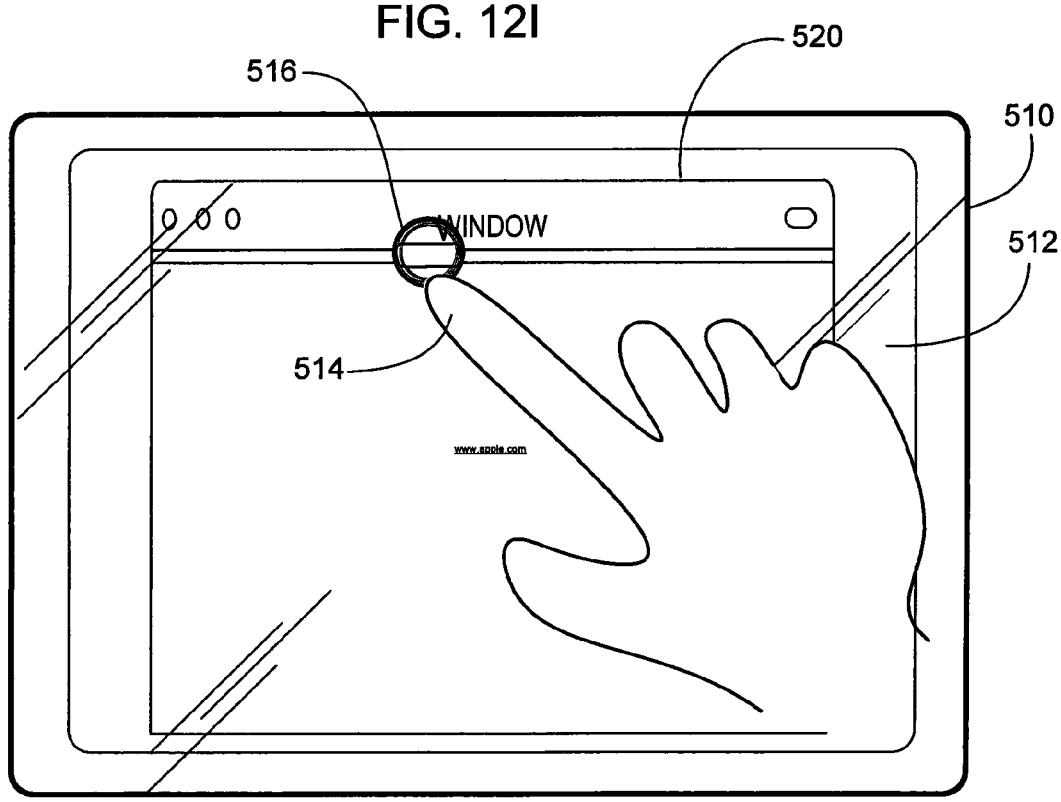
Figure 12K:
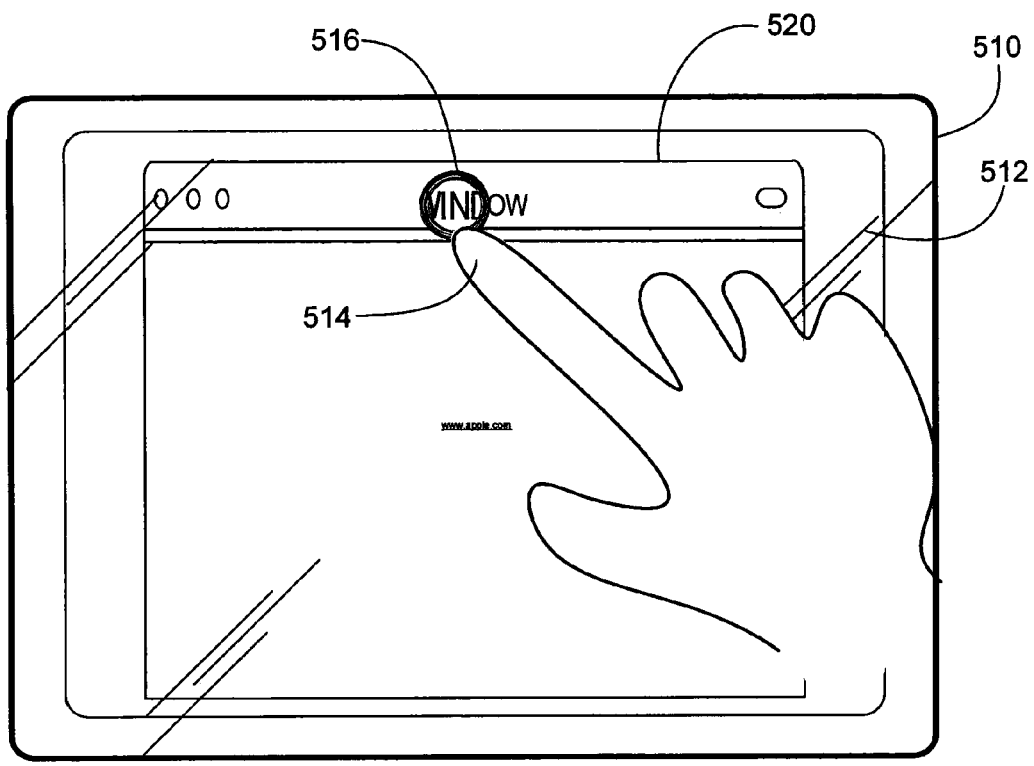
Figure 12L:
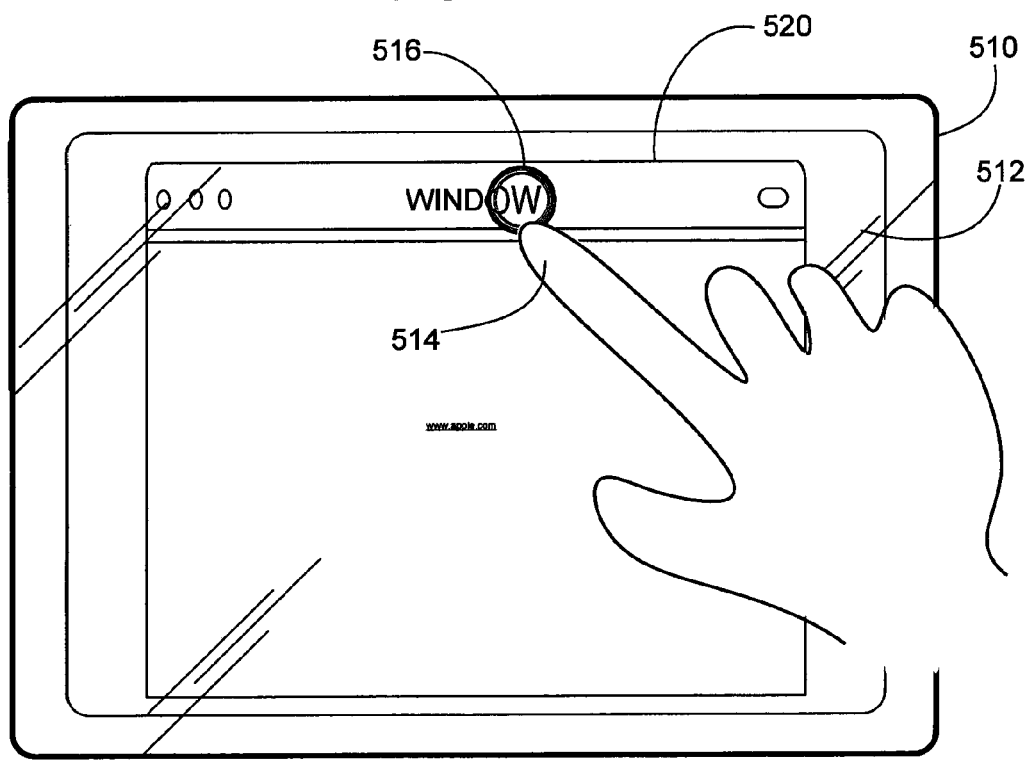
Figure 12M:
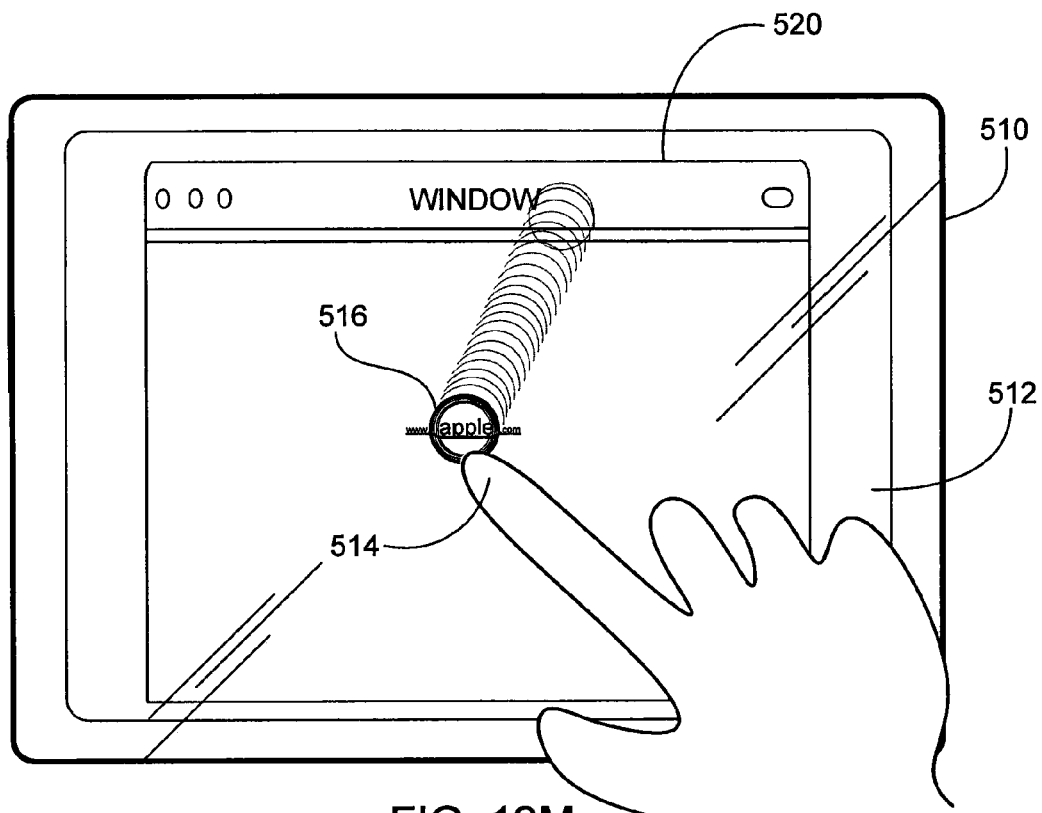
Figure 12N:
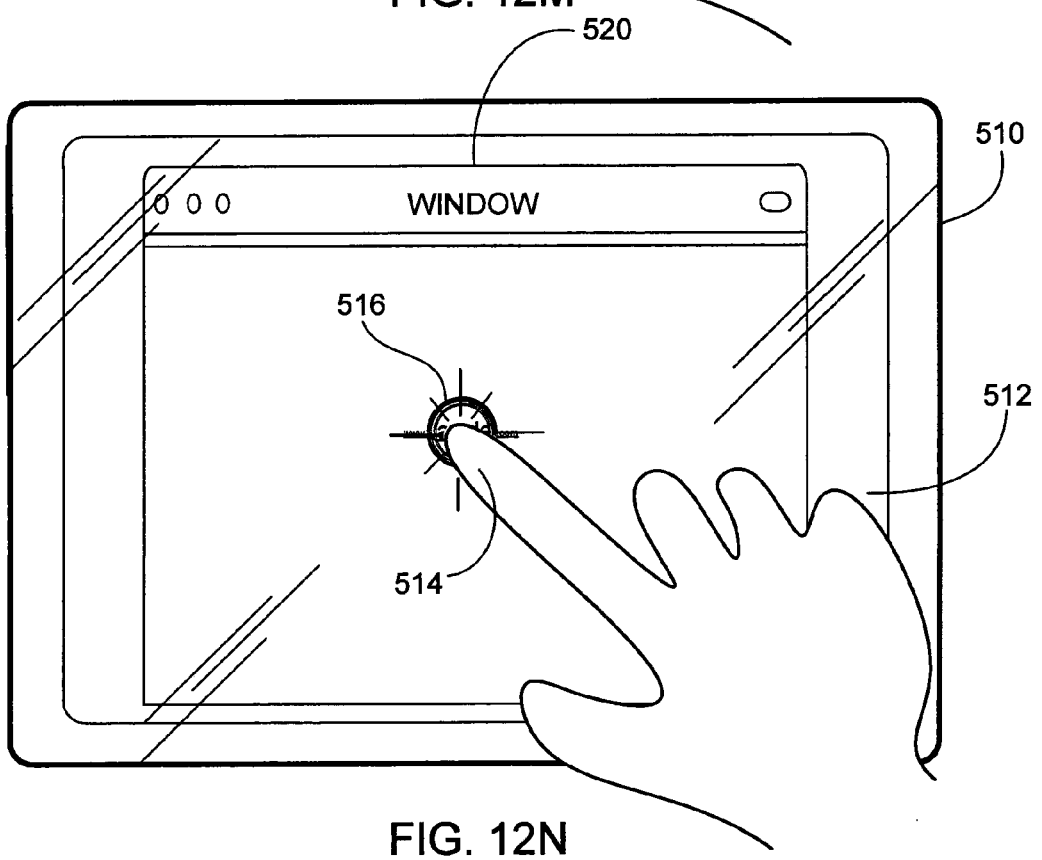

FIGS. 12A-12N illustrate an exemplary sequence using some of the techniques described above. This particular sequence shows for example expansion of a localized area as a finger is moved across the touchscreen of touchscreen display. As shown in FIG. 12A, a display portion of a touchscreen display 510 presents a GUI 512 to a user. As shown in FIG. 12B, the user places their finger 514 on the touchscreen portion of the touchscreen display 510 and over an area of the GUI 512. As shown in FIG. 12C, after the finger 514 dwells for some time over the GUI 512, a localized area 516 of the GUI 512 is expanded. In this particular illustration, the localized area 516 includes a plateau region and a transition region that is located between the plateau region and the remaining portions of the GUI. The targeted area in proximity to the finger is presented in an enlarged and magnified state within the plateau region while the remaining portions are not. Furthermore, the transition region compresses the graphical information between the plateau and the remaining portions. The compressing causes the plateau to appear raised relative to the remaining portions. The transition region generally provides gradient of magnification between the remaining portions and the plateau such that the information contained therein looks somewhat distorted or stretched.

As shown in FIG. 12D, as the finger 514 maintains contact and is moved to the right, the localized expanded area 516 moves with the finger 514. A different portion of the GUI 512 is therefore expanded. In this particular case, the edge of a window 520 comes into the center of the plate and a button is disposed partially in the plateau and partially in the transition region. In the illustrated sequence, the portions in the plateau are magnified at a constant level and the portions in the transition region are magnified in a descending manner. As shown in FIG. 12E, as the finger 514 continues to move, the first button is positioned within the center of the plateau and a second button is disposed partially in the plateau region and partially in the transition region. As shown in FIG. 12F, as the finger 514 continues to move, the second button is positioned within the center of the plateau and a first and third buttons are disposed partially in the plateau region and partially in the transition region. As shown in FIG. 12G, as the finger 514 continues to move, the third button is positioned within the center of the plateau and the second button is disposed partially in the plateau region and partially in the transition region. As shown in FIG. 12H, as the finger 514 continues to move, the third button is disposed partially in the plateau region and partially in the transition region. It should be noted at this time that if the user had decided to select any of the buttons, they could have done so when the button was located within the plateau region. This may have been accomplished with increased touch pressure or by tapping the button.

As shown in FIG. 12I, as the finger 514 moves away from the buttons, it moves over an inside edge of the window 520 thereby causing the inside edge to be expanded. As shown in FIG. 12J, as the finger moves along the window 520, the window title comes into view. Similar to the buttons, the portions of the title in the plateau are fully enlarged and magnified while the portions in the transition region are distorted. As shown in FIGS. 12K and 12L, this effect is continues as the finger 514 moves across the title.

As shown in FIG. 12M, the finger 514 is moved from the title to a link positioned within the window 520. Similar to the buttons and title, the portions of the link in the plateau are fully enlarged and magnified while the portions in the transition region are distorted and further the portions outside the expansion are of normal size and magnification. As shown in FIG. 12N, the user exerts a greater pressure on the touchscreen while the link is in its expanded form. This increased pressure is recognized as a touch event, and the element associated with link is launched or opened (although not shown).

Figure 13A:
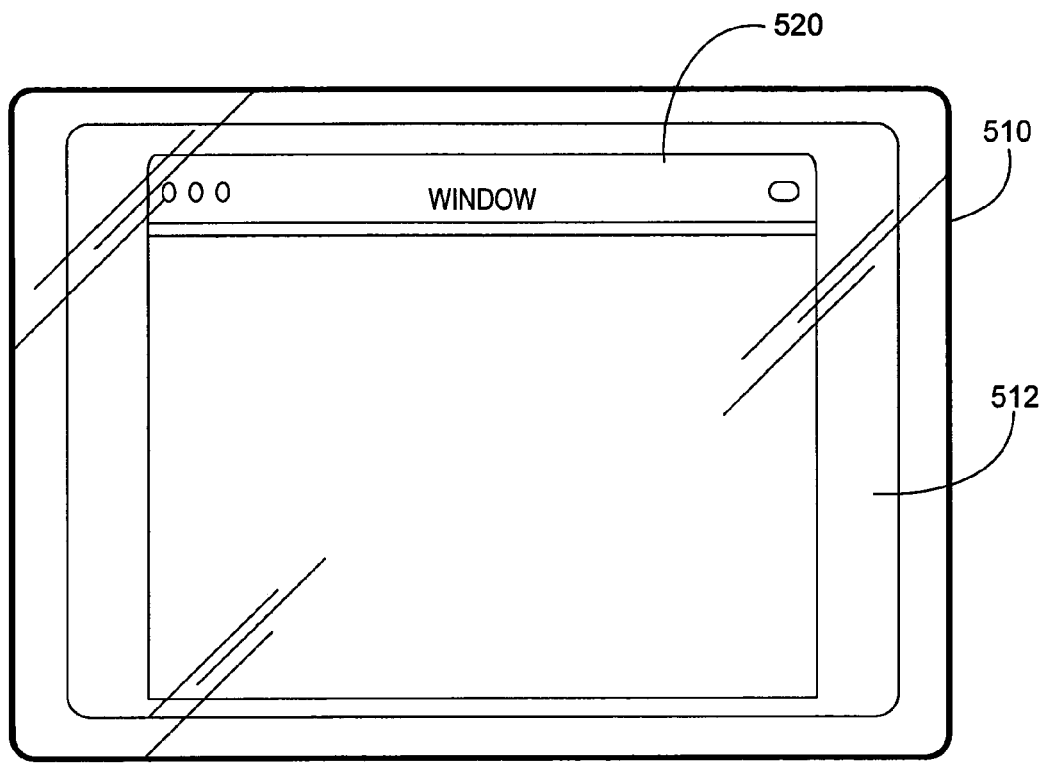
FIGS. 13A-13D illustrate an exemplary expansion sequence, in accordance with one embodiment of the present invention.
Figure 13B:
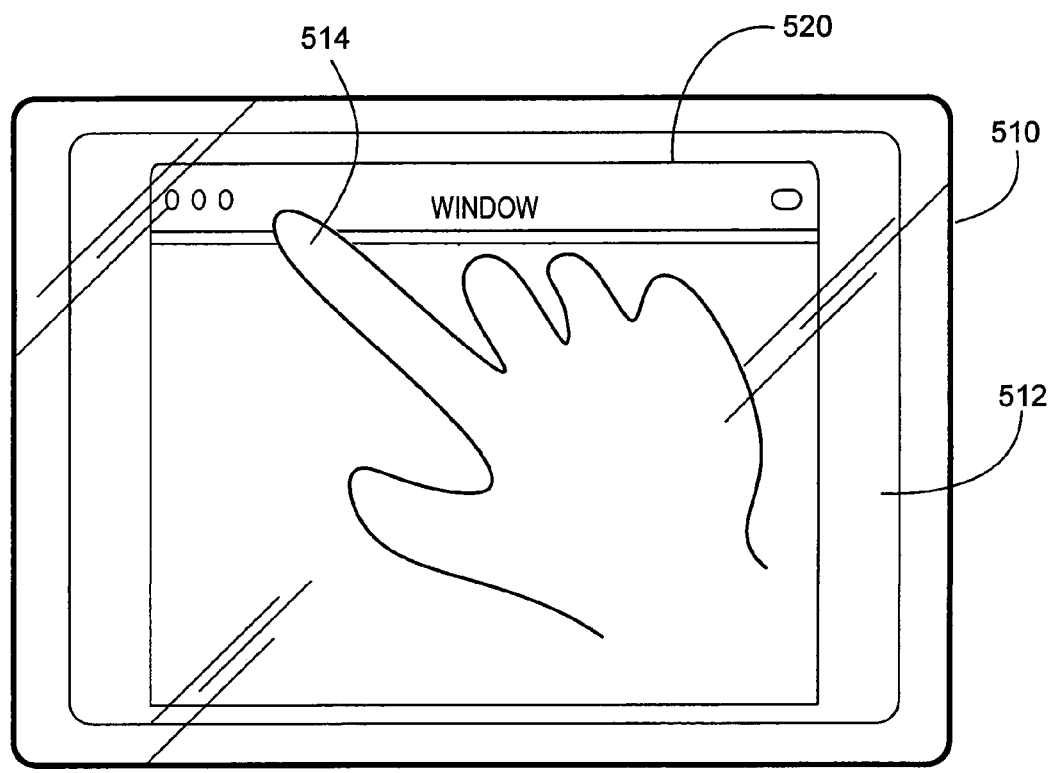
Figure 13C:
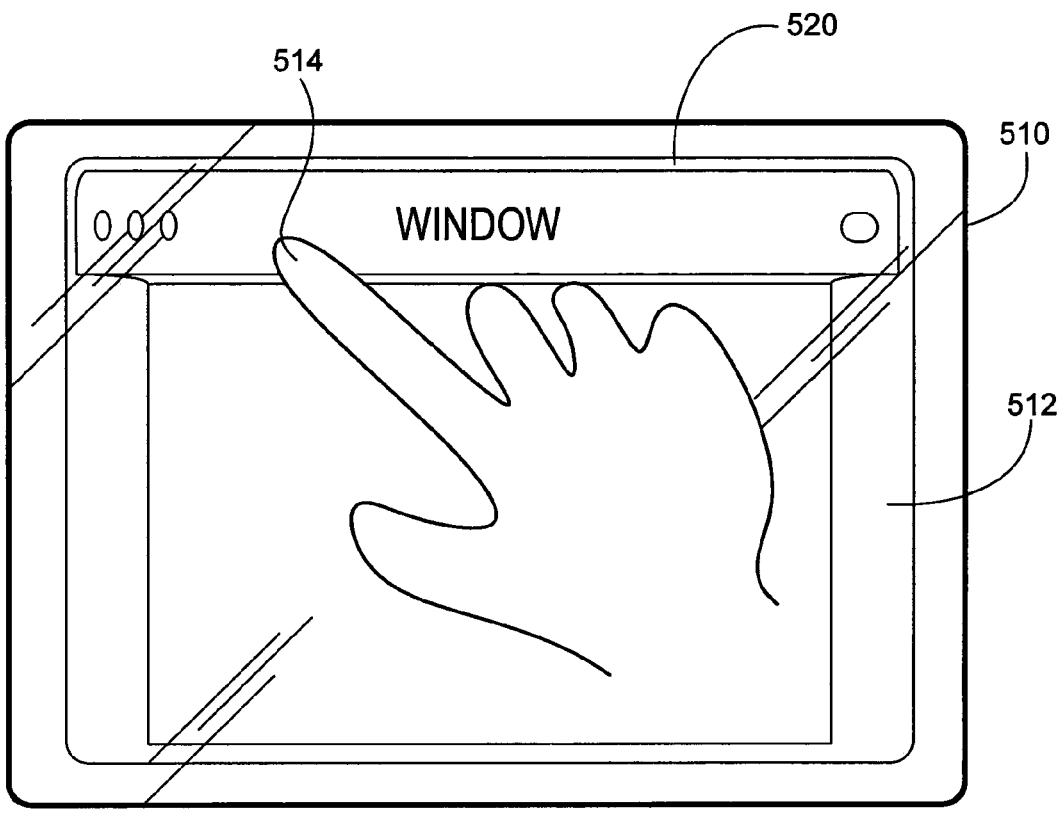
Figure 13D:
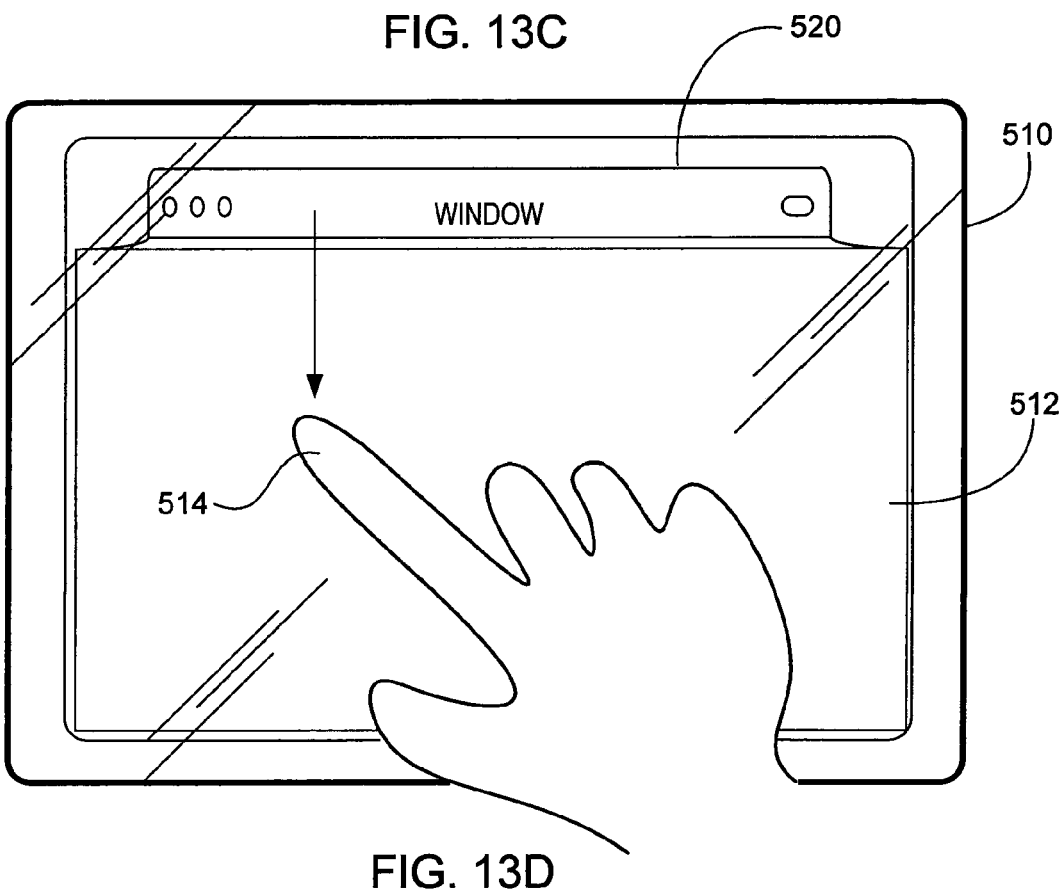

FIGS. 13A-13D illustrate an exemplary sequence using some of the techniques described above. This particular sequence shows for example expansion of different objects as a finger is moved across the touchscreen of touchscreen display. As shown in FIG. 13A, a display portion of a touchscreen display 510 presents a GUI 512 to a user. As shown in FIG. 13B, the user places their finger 514 on the touchscreen portion of the touchscreen display 510 and over an area of the GUI 512. In this particular case, the finger 514 is placed over the heading portion of the window 520. As shown in FIG. 13C, after the finger 514 dwells for some time over the heading, the heading is expanded. In this illustration, the heading is presented in an enlarged and magnified state while the remaining portions are not. As shown in FIG. 13D, when the finger 514 maintains contact with the touchscreen and is moved over a different GUI object as for example the field of the window, the field is expanded. In this illustration, the field is presented in an enlarged and magnified state while the remaining portions are not (including the heading).

FIG. 14 is a block diagram of an exemplary computer system 650, in accordance with one embodiment of the present invention. The computer system 650 may correspond to a personal computer, such as a desktop, laptop, tablet or handheld computer. The computer system may also correspond to other types of computing devices such as a cell phones, PDAs, media players, consumer electronic devices, and/or the like.

The exemplary computer system 650 shown in FIG. 14 includes a processor 656 configured to execute instructions and to carry out operations associated with the computer system 650. For example, using instructions retrieved for example from memory, the processor 656 may control the reception and manipulation of input and output data between components of the computing system 650. The processor 656 can be implemented on a single-chip, multiple chips or multiple electrical components. For example, various architectures can be used for the processor 656, including dedicated or embedded processor, single purpose processor, controller, ASIC, and so forth.

In most cases, the processor 656 together with an operating system operates to execute computer code and produce and use data. By way of example, the operating system may correspond to Mac OS, OS/2, DOS, Unix, Linux, Palm OS, and the like. The operating system can also be a special purpose operating system, such as may be used for limited purpose appliance-type computing devices. The operating system, other computer code and data may reside within a memory block 658 that is operatively coupled to the processor 656. Memory block 658 generally provides a place to store computer code and data that are used by the computer system 650. By way of example, the memory block 658 may include Read-Only Memory (ROM), Random-Access Memory (RAM), hard disk drive and/or the like. The information could also reside on a removable storage medium and loaded or installed onto the computer system 650 when needed. Removable storage media include, for example, CD-ROM, PC-CARD, memory card, floppy disk, magnetic tape, and a network component.

The computer system 650 also includes a display device 668 that is operatively coupled to the processor 656. The display device 668 may be a liquid crystal display (LCD) (e.g., active matrix, passive matrix and the like). Alternatively, the display device 668 may be a monitor such as a monochrome display, color graphics adapter (CGA) display, enhanced graphics adapter (EGA) display, variable-graphics-array (VGA) display, super VGA display, cathode ray tube (CRT), and the like. The display device may also correspond to a plasma display or a display implemented with electronic inks.

The display device 668 is generally configured to display a graphical user interface (GUI) that provides an easy to use interface between a user of the computer system and the operating system or application running thereon. Generally speaking, the GUI represents, programs, files and operational options with graphical images. The graphical images may include windows, fields, dialog boxes, menus, icons, buttons, cursors, scroll bars, etc. Such images may be arranged in predefined layouts, or may be created dynamically to serve the specific actions being taken by a user. During operation, the user can select and activate various graphical images in order to initiate functions and tasks associated therewith. By way of example, a user may select a button that opens, closes, minimizes, or maximizes a window, or an icon that launches a particular program. The GUI can additionally or alternatively display information, such as non interactive text and graphics, for the user on the display device 668.

The computer system 650 also includes an input device 670 that is operatively coupled to the processor 656. The input device 670 is configured to transfer data from the outside world into the computer system 650. The input device 670 may include a touch sensing device configured to receive input from a user's touch and to send this information to the processor 656. In many cases, the touch-sensing device recognizes touches, as well as the position and magnitude of touches on a touch sensitive surface. The touch sensing means reports the touches to the processor 656 and the processor 656 interprets the touches in accordance with its programming. For example, the processor 656 may initiate a task in accordance with a particular touch. A dedicated processor can be used to process touches locally and reduce demand for the main processor of the computer system. The touch sensing device may be based on sensing technologies including but not limited to capacitive sensing, resistive sensing, surface acoustic wave sensing, pressure sensing, optical sensing, and/or the like. Furthermore, the touch sensing means may be based on single point sensing or multipoint sensing. Single point sensing is capable of only distinguishing a single touch, while multipoint sensing is capable of distinguishing multiple touches that occur at the same time.

In the illustrated embodiment, the input device 670 is a touch screen that is positioned over or in front of the display 668. The touch screen 670 may be integrated with the display device 668 or it may be a separate component. The touch screen 670 has several advantages over other input technologies such as touchpads, mice, etc. For one, the touch screen 670 is positioned in front of the display 68 and therefore the user can manipulate the GUI directly. For example, the user can simply place their finger over an object to be selected, activated, controlled, etc. In touch pads, there is no one-to-one relationship such as this. With touchpads, the touchpad is placed away from the display typically in a different plane.

For example, the display is typically located in a vertical plane and the touchpad is typically located in a horizontal plane. This makes its use less intuitive, and therefore more difficult when compared to touch screens.

The touchscreen can be a single point or multipoint touchscreen. Multipoint input devices have advantages over conventional single point devices in that they can distinguish more than one object (finger) simultaneously. Single point devices are simply incapable of distinguishing multiple objects at the same time. By way of example, a multipoint touch screen, which can be used herein, is shown and described in greater detail in copending and commonly assigned U.S. patent application Ser. No. 10/840,862, which is hereby incorporated herein by reference.

The computer system 650 also includes capabilities for coupling to one or more I/O devices 680. By way of example, the I/O devices 680 may correspond to keyboards, printers, scanners, cameras, speakers, and/or the like. The I/O devices 680 may be integrated with the computer system 650 or they may be separate components (e.g., peripheral devices). In some cases, the I/O devices 680 may be connected to the computer system 650 through wired connections (e.g., cables/ports). In other cases, the I/O devices 680 may be connected to the computer system 650 through wireless connections. By way of example, the data link may correspond to PS/2, USB, IR, RF, Bluetooth or the like.

In accordance with one embodiment of the present invention, the memory block 658 includes an expansion program 688 for controlling the expansion of the touchscreen display 668/670, particularly both the image and input level of the touchscreen display. By way of example, the expansion methodology shown and described in the previous figures may be utilized by the expansion program. In one embodiment, the expansion program is integrated with or part of the operating system. The expansion therefore can be implemented in any of the displayed pages operating under the control of the operating system (e.g., system pages, webpages, application pages, etc.). Alternatively, the expansion program may be part of a separate application.

The expansion program 688 may include an expansion database that stores the expansion characteristics. The expansion characteristics generally refer to how the system is to be expanded, i.e., the expansion program refers to the expansion characteristics when implementing expansion. The expansion characteristics may include for example magnification levels, the size and shape of the expanded area, the slope of the transition area, rate of expansion, the latency time before the expanded area returns to normal state, the dwell time before the expansion is implemented, touch pressure, tapping speed, hovering time, etc. The expansion characteristics stored in the database may be accessed by a user through an expansion control menu, which may be viewed on a display screen as part of the GUI. The expansion control menu may include expansion control settings pertaining to the expansion characteristics. In fact, the expansion control menu may serve as a control panel for reviewing and/or customizing the expansion control settings, i.e., the user may quickly and conveniently review the expansion control settings and make changes thereto. Once the user saves the changes, the modified expansion control settings will be employed to handle future expansion. Furthermore, it may be possible for the user to disable the expansion feature so that the system can revert to a more conventional one.

Figure 15:
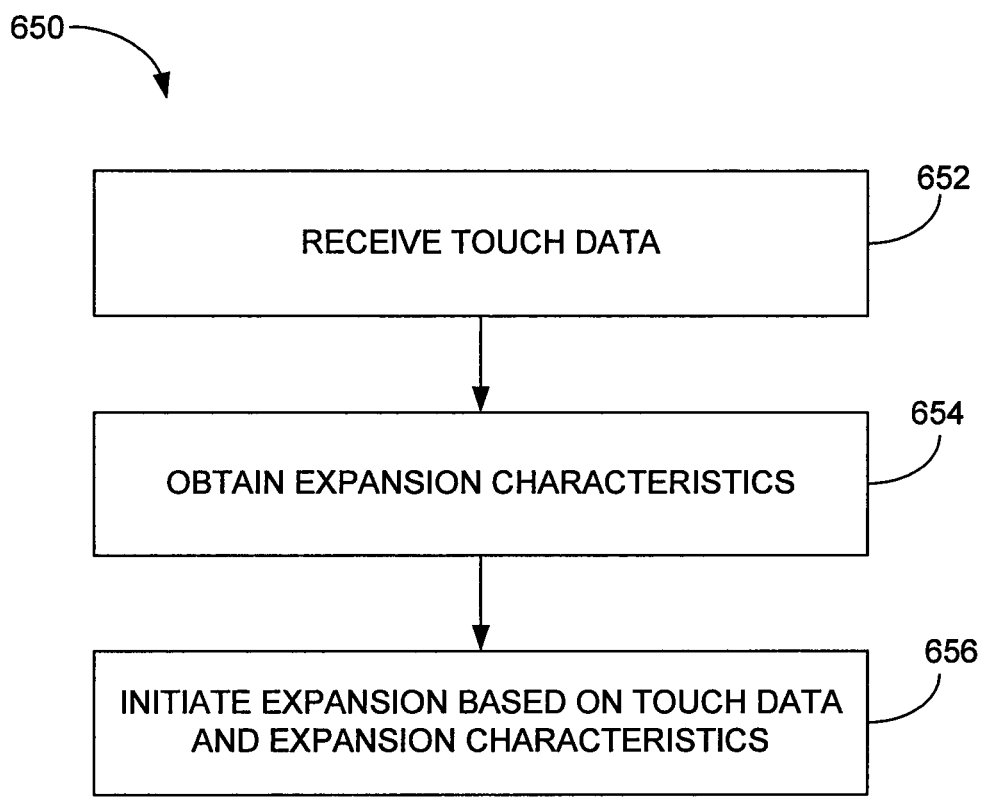
FIG. 15 is a flow diagram of expansion processing, in accordance with one embodiment of the invention.

FIG. 15 is a flow diagram of expansion processing 650, in accordance with one embodiment of the invention. Expansion processing 650 may be performed via a computing device such as the one described in FIG. 14 in order to provide a touch screen display with an expansion effect. Expansion processing 650 generally begins at block 652 where touch data is received. The touch data may for example be received from a touchscreen. After block 652, the process proceeds to block 654 where expansion characteristics are obtained. The expansion characteristics may for example be stored in a database of the computing device. Expansion characteristics generally refer to when and how an expansion effect is implemented. The expansion characteristics may for example include whether or not the expansion feature is activated, the touch configuration needed to initiate expansion (e.g., duration), the location, size, magnification level and shape of the expansion, the slope of the transition, the rate of expansion, whether the expansion follows motion, and the like. The expansion characteristics may also identify a type and nature of expansion that is to be provided for a specific touch data. For example, at this touch pressure, the expansion effect follows this rate of expansion. After block 654, the process proceeds to block 656 where expansion is initiated based on the touch data and the expansion characteristics. By way of example, the display may be instructed to visually expand a targeted area while keeping the other areas unexpanded, and further to scale the input sensitivity with the visual expansion. The manner in which this happens depends on the touch data (location, duration, pressure, etc.) and the expansion characteristics that are selected at the time of expansion processing.

The various aspects of the expansion processing described above can be used alone or in various combinations. The expansion processing is preferably implemented by a combination of hardware and software, but can also be implemented in hardware or software. The expansion processing can also be embodied as computer readable code on a computer readable medium. The computer readable medium is any data storage device that can store data, which can thereafter be read by a computer system.

While this invention has been described in terms of several preferred embodiments, there are alterations, permutations, and equivalents, which fall within the scope of this invention. For example, although the invention is primarily directed at touch screens, other sensing devices that do not require touches may be used. By way of example, sensors that can detect the proximity of an object to a surface even when the object is not in contact with the surface may be used (e.g., proximity sensors). It should also be noted that there are many alternative ways of implementing the methods and apparatuses of the present invention. It is therefore intended that the following appended claims be interpreted as including all such alterations, permutations, and equivalents as fall within the true spirit and scope of the present invention.

What is claimed is:

1. A computing device, comprising:
a touchscreen display;
one or more processors;
memory; and
one or more programs, wherein the one or more programs are stored in the memory and configured to be executed by the one or more processors, the one or more programs including instructions for:
presenting graphical information on the touchscreen display, wherein the graphical information on the touchscreen display comprises a plurality of regions;
detecting a finger touch at a location on the touchscreen display;
in response to detecting the finger touch, expanding a localized area of the graphical information on the touchscreen display based on region sensitivity, wherein:

the expanded localized area is proximate the location of the finger touch, the expanded localized area includes a plateau region that displays a magnified portion of the graphical information at a constant magnification level, and the plateau region with the constant magnification level is expanded to a first fixed size in response to detecting the finger touch when the finger touch is located in a first region in the plurality of regions, and the plateau region with the constant magnification level is expanded to a second fixed size different from the first fixed size in response to detecting the finger touch when the finger touch is located in a second region in the plurality of regions different from the first region; and, while continuing to detect the finger touch on the touchscreen display:

detecting a movement of the finger touch over the touchscreen display; and, in response to detecting the movement, continuously changing a respective location of the expanded localized area to follow the movement of the finger touch.

2. The computing device as recited in claim 1, wherein the expanded localized area is offset from the respective location of the touch.

3. A method, comprising:

at portable electronic device with a touchscreen display:

presenting graphical information on the touchscreen display, wherein the graphical information on the touchscreen display comprises a plurality of regions;

detecting a finger touch at a location on the touchscreen display;

in response to detecting the finger touch, expanding a localized area of the graphical information on the touchscreen display based on region sensitivity, wherein:

the expanded localized area is proximate the location of the finger touch, the expanded localized area includes a plateau region that displays a magnified portion of the graphical information at a constant magnification level, and the plateau region with the constant magnification level is expanded to a first fixed size in response to detecting the finger touch when the finger touch is located in a first region in the plurality of regions, and the plateau region with the constant magnification level is expanded to a second fixed size different from the first fixed size in response to detecting the finger touch when the finger touch is located in a second region in the plurality of regions different from the first region; and, while continuing to detect the finger touch on the touchscreen display:

detecting a movement of the finger touch over the touchscreen display; and, in response to detecting the movement, continuously changing a respective location of the expanded localized area to follow the movement of the finger touch.

4. A non-transitory computer readable storage medium storing one or more programs, including instructions, which when executed by a portable multifunction device with a touchscreen display, cause the device to:

present graphical information on the touchscreen display, wherein the graphical information on the touchscreen display comprises a plurality of regions;

detect a finger touch at a location on the touchscreen display;

in response to detecting the finger touch, expand a localized area of the graphical information on the touchscreen display based on region sensitivity, wherein:

the expanded localized area is proximate the location of the finger touch, the expanded localized area includes a plateau region that displays a magnified portion of the graphical information at a constant magnification level, and the plateau region with the constant magnification level is expanded to a first fixed size in response to detecting the finger touch when the finger touch is located in a first region in the plurality of regions, and the plateau region with the constant magnification level is expanded to a second fixed size different from the first fixed size in response to detecting the finger touch when the finger touch is located in a second region in the plurality of regions different from the first region; and, while continuing to detect the finger touch on the touchscreen display:

detect a movement of the finger touch over the touchscreen display; and, in response to detecting the movement, continuously change a respective location of the expanded localized area to follow the movement of the finger touch.

5. A graphical user interface on a portable electronic device with a touchscreen display, a memory, and one or more processors to execute one or more programs stored in memory, the graphical user interface comprising:

graphical information presented on the touchscreen display, wherein the graphical information on the touchscreen display comprises a plurality of regions;

wherein:

a finger touch is detected at a location on the touchscreen display;

a localized area of the graphical information is expanded on the touchscreen display based on region sensitivity in response detecting the finger touch, wherein:

the expanded localized area is proximate the location of the finger touch, the expanded localized area includes a plateau region that displays a magnified portion of the graphical information at a constant magnification level, and the plateau region with the constant magnification level is expanded to a first fixed size in response to detecting the finger touch when the finger touch is located in a first region in the plurality of regions, and the plateau region with the constant magnification level is expanded to a second fixed size different from the first fixed size in response to detecting the finger touch when the finger touch is located in a second region in the plurality of regions different from the first region; and, while continuing to detect the finger touch on the touchscreen display:

a movement of the finger touch is detected over the touchscreen display; and, a respective location of the expanded localized area is continuously changed to follow the movement of the finger touch in response to detecting the movement of the finger touch.

6. A computing device, comprising:

a touchscreen display;

one or more processors;

memory; and one or more programs, wherein the one or more programs are stored in the memory and configured to be executed by the one or more processors, the one or more programs including instructions for:

presenting graphical information on the touchscreen display, wherein the graphical information on the touchscreen display comprises a plurality of regions;

detecting a finger touch at a location on the touchscreen display;

in response to detecting the finger touch, expanding a localized area of the graphical information on the touchscreen display to a first fixed size based on region sensitivity, wherein:
- the expanded localized area is proximate the location of the finger touch,
- the expanded localized area includes a plateau region with a fixed size that displays a magnified portion of the graphical information at a constant magnification level, and
- the constant magnification level of the entire plateau region with the fixed size in the expanded localized area is a first magnification level in response to detecting the finger touch when the finger touch is located in a first region in the plurality of regions, and the constant magnification level of the entire plateau region with the fixed size is a second magnification level different from the first magnification level in response to detecting the finger touch when the finger touch is located in a second region in the plurality of regions different from the first region; and, while continuing to detect the finger touch on the touchscreen display:
- detecting a movement of the finger touch over the touchscreen display; and,
- in response to detecting the movement, continuously changing a respective location of the expanded localized area to follow the movement of the finger touch.

7. The computing device as recited in claim 6, wherein the expanded localized area is offset from the respective location of the touch.

8. A method, comprising:

at portable electronic device with a touchscreen display:
presenting graphical information on the touchscreen display, wherein the graphical information on the touchscreen display comprises a plurality of regions;

detecting a finger touch at a location on the touchscreen display;

in response to detecting the finger touch, expanding a localized area of the graphical information on the touchscreen display to a first fixed size based on region sensitivity, wherein:
- the expanded localized area is proximate the location of the finger touch,
- the expanded localized area includes a plateau region with a fixed size that displays a magnified portion of the graphical information at a constant magnification level, and
- the constant magnification level of the entire plateau region with the fixed size in the expanded localized area is a first magnification level in response to detecting the finger touch when the finger touch is located in a first region in the plurality of regions, and the constant magnification level of the entire plateau region with the fixed size is a second magnification level different from the first magnification level in response to detecting the finger touch when the finger touch is located in a second region in the plurality of regions different from the first region; and, while continuing to detect the finger touch on the touchscreen display:
- detecting a movement of the finger touch over the touchscreen display; and,
- in response to detecting the movement, continuously changing a respective location of the expanded localized area to follow the movement of the finger touch.

9. A non-transitory computer readable storage medium storing one or more programs, including instructions, which when executed by a portable multifunction device with a touchscreen display, cause the device to:

present graphical information on the touchscreen display, wherein the graphical information on the touchscreen display comprises a plurality of regions;

detect a finger touch at a location on the touchscreen display;

in response to detecting the finger touch, expand a localized area of the graphical information on the touchscreen display to a first fixed size based on region sensitivity, wherein:
- the expanded localized area is proximate the location of the finger touch,
- the expanded localized area includes a plateau region with a fixed size that displays a magnified portion of the graphical information at a constant magnification level, and
- the constant magnification level of the entire plateau region with the fixed size in the expanded localized area is a first magnification level in response to detecting the finger touch when the finger touch is located in a first region in the plurality of regions, and the constant magnification level of the entire plateau region with the fixed size is a second magnification level different from the first magnification level in response to detecting the finger touch when the finger touch is located in a second region in the plurality of regions different from the first region; and, while continuing to detect the finger touch on the touchscreen display:
- detect a movement of the finger touch over the touchscreen display; and,
- in response to detecting the movement, continuously change a respective location of the expanded localized area to follow the movement of the finger touch.

10. A graphical user interface on a portable electronic device with a touchscreen display, a memory, and one or more processors to execute one or more programs stored in memory, the graphical user interface comprising:

graphical information presented on the touchscreen display, wherein the graphical information on the touchscreen display comprises a plurality of regions;

wherein:
- a finger touch is detected at a location on the touchscreen display;
- a localized area of the graphical information is expanded on the touchscreen display to a first fixed size based on region sensitivity in response to detecting the finger touch, wherein:
  - the expanded localized area is proximate the location of the finger touch,
  - the expanded localized area includes a plateau region with a fixed size that displays a magnified portion of the graphical information at a constant magnification level, and the constant magnification level of the entire plateau region with the fixed size in the expanded localized area is a first magnification level in response to detecting the finger touch when the finger touch is located in a first region in the plurality of regions, and the constant magnification level of the entire plateau region with the fixed size is a second magnification level different from the first magnification level in response to detecting the finger touch when the finger touch is located in a second region in the plurality of regions different from the first region; and, while continuing to detect the finger touch on the touchscreen display:

a movement of the finger touch is detected over the touchscreen display; and, a respective location of the expanded localized area is continuously changed to follow the movement of the finger touch in response to detecting the movement of the finger touch.

\* \* \* \* \*